(12) United States Patent
Agrawal et al.

(10) Patent No.: US 12,531,941 B2
(45) Date of Patent: Jan. 20, 2026

(54) ROLLABLE SCREEN SIMULTANEOUS DISPLAY CALL USE

(71) Applicant: Motorola Mobility LLC, Chicago, IL (US)

(72) Inventors: Amit Kumar Agrawal, Bangalore (IN); Bianca Boccato, Campinas (BR); Jose Guilherme Simao Prado, Campinas (BR); Letricia Pereira Avalhais, Jaguariuna (BR); Roberto Bresil, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 332 days.

(21) Appl. No.: 18/133,196

(22) Filed: Apr. 11, 2023

(65) Prior Publication Data
US 2024/0348709 A1   Oct. 17, 2024

(51) Int. Cl.
*H04M 1/02* (2006.01)
(52) U.S. Cl.
CPC .............................. *H04M 1/0268* (2013.01)
(58) Field of Classification Search
None
See application file for complete search history.

(56) References Cited

U.S. PATENT DOCUMENTS

| | | | |
|---|---|---|---|
| 9,807,213 B2 | 10/2017 | Stewart | |
| 10,063,677 B2 | 8/2018 | Cavallaro et al. | |
| 11,968,319 B2 | 4/2024 | Desai et al. | |
| 12,192,399 B2 * | 1/2025 | Kim | H04M 1/0237 |
| 2012/0183154 A1 | 7/2012 | Boemer et al. | |
| 2018/0018753 A1 | 1/2018 | Mclaughlin et al. | |
| 2019/0311718 A1 | 10/2019 | Huber | |
| 2020/0012425 A1 * | 1/2020 | Kim | G06F 1/1652 |
| 2022/0197581 A1 * | 6/2022 | Lee | H04M 1/72409 |
| 2023/0208963 A1 | 6/2023 | Desai et al. | |
| 2025/0168269 A1 * | 5/2025 | Shin | G06F 1/1624 |

OTHER PUBLICATIONS

U.S. Appl. No. 17/563,456 , "Non-Final Office Action", U.S. Appl. No. 17/563,456, Sep. 29, 2023, 16 pages.
U.S. Appl. No. 17/563,456 , "Notice of Allowance", U.S. Appl. No. 17/563,456, Dec. 21, 2023, 6 pages.

* cited by examiner

*Primary Examiner* — Alison Slater
(74) *Attorney, Agent, or Firm* — FIG. 1 Patents

(57) ABSTRACT

In aspects of rollable screen simultaneous display call use, a mobile device includes a rollable display screen configurable in one of multiple display states, the rollable display screen including a front-facing portion of the rollable display screen and a rear-facing portion of the rollable display screen. The mobile device implements a call manager that detects a phone call is initiated and displayable call content is associated with the phone call. The call manager determines to display the displayable call content associated with the phone call on the front-facing portion of the rollable display screen. The call manager then initiates to configure the rollable display screen in a display state that facilitates use of the front-facing portion of the rollable display screen to display the displayable call content associated with the phone call.

20 Claims, 13 Drawing Sheets

ROLLABLE SCREEN SIMULTANEOUS DISPLAY CALL USE

BACKGROUND

Devices such as smart devices, mobile devices (e.g., cellular phones, tablet devices, smartphones), consumer electronics, and the like can be implemented for use in a wide range of environments and for a variety of different applications. Generally, mobile devices come in varying sizes and form factors, such as rectangular with an overall rigid shape, foldable devices with a housing that is hinged allowing a device to fold, and slidable devices with housing sections that slide apart and back together. Consumers typically want smaller devices that are convenient to carry, yet also prefer devices that have some expandability for larger display viewing, such as with the foldable and slidable devices. However, as device form factors become smaller, such as for compact mobile phones that are convenient to carry, viewing content on a smaller display screen may be perceived as a poor user experience, such as when interacting on a video call.

BRIEF DESCRIPTION OF THE DRAWINGS

Implementations of the techniques for rollable screen simultaneous display call use are described with reference to the following Figures. The same numbers may be used throughout to reference like features and components shown in the Figures.

DETAILED DESCRIPTION

Figure 1:
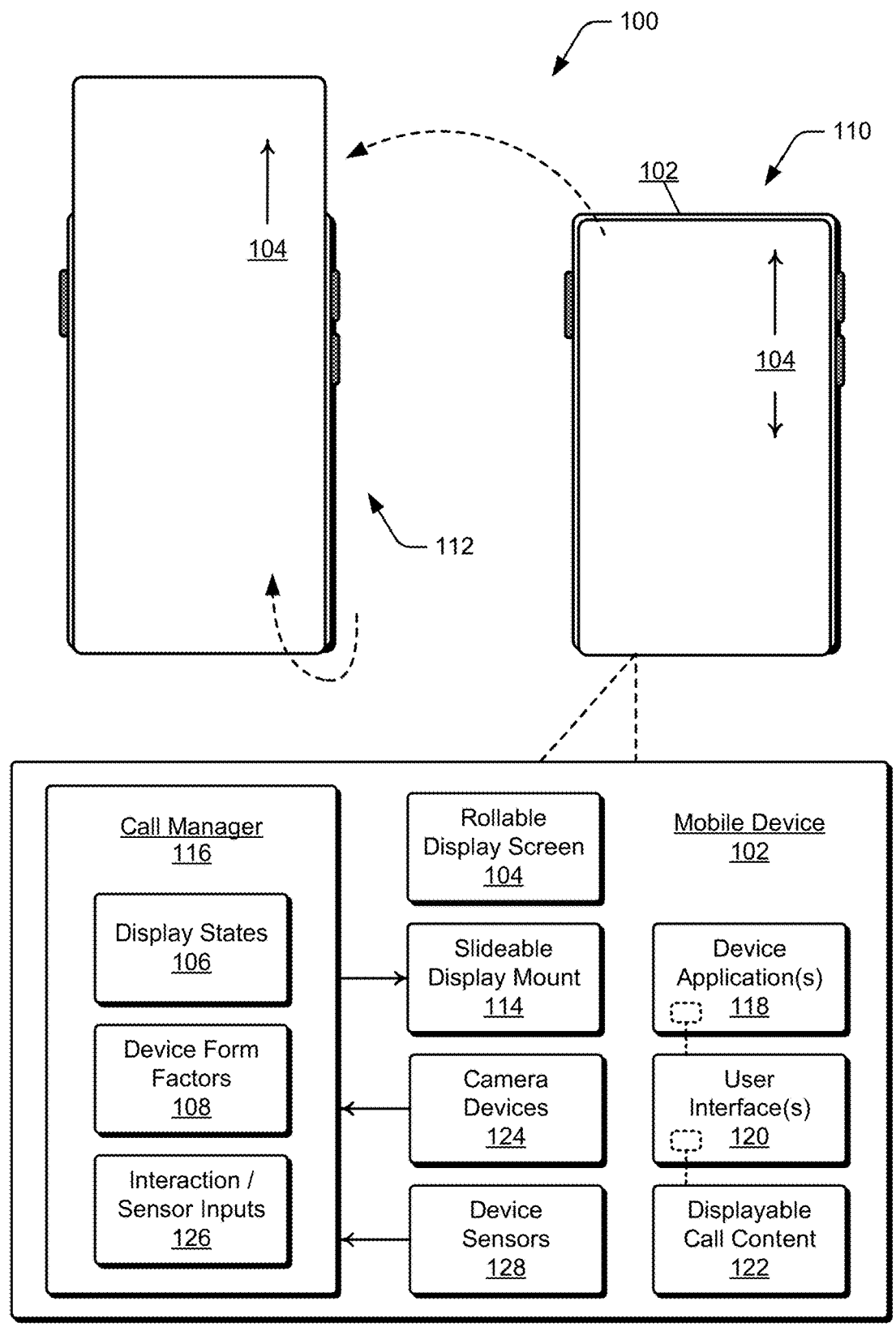
FIG. 1 illustrates an example system for rollable screen simultaneous display call use in accordance with one or more implementations as described herein.

Implementations of techniques for rollable screen simultaneous display call use are implemented as described herein, and the techniques apply to any device that is configurable in various form factors, such as any type of extendable device which can change form factors automatically. A rollable screen device, such as a mobile device (e.g., any type of mobile phone, wireless device, and/or electronic device) can include a rollable display screen that can be configured in any one of various display states, which correspond to respective mobile device form factors. For example, device form factors can include a compact form factor, an expanded form factor, a partial form factor (also referred to as a "peek" form factor), as well as other device form factors. The rollable display screen may be positioned in any incremental display state corresponding to device form factors, such as from the partial form factor to the compact form factor, and between the compact form factor and the expanded form factor. The mobile device includes a slidable display mount that is a powered sliding or translation mechanism operable to transition the rollable display screen between the various display states.

In implementations, the rollable display screen has a front-facing portion of the display screen and at least one rear-facing portion of the display screen. In other implementations, the rollable display screen can include a second rear-facing portion. The techniques described herein allow for simultaneous utilization of the front-facing portion that is viewable on a first side of the mobile device and the rear-facing portion is viewable on a second side of the mobile device. The rear-facing portion of the rollable display screen wraps around a first end of mobile device as a continuation of the front-facing portion of the rollable display screen. Further, the rollable display screen can include the second rear-facing portion, and in an alternate configuration, the second rear-facing portion of the rollable display screen wraps around a second end of the mobile device as a further continuation of the front-facing portion of the rollable display screen.

In aspects of rollable screen simultaneous display call use, a mobile device implements a call manager as any type of control unit that manages a configuration of the rollable display screen, such as in conjunction with a phone call that has been initiated on the mobile device. In implementations, the call manager can detect a phone call as an incoming phone call to the mobile device, or detect a phone call as an outgoing phone call initiated by a user of the mobile device. A phone call on the device may also have associated displayable call content, such as for a video call, in which case streaming video is received showing a remote user on the phone call with the user of the mobile device. In other implementations, the displayable call content that is associated with a phone call may be real time text (RTT), which is displayable as a text conversation version of the phone call between the user of the mobile device and the remote user.

The call manager can detect that the user of the mobile device is in a position to view the front-facing portion of the rollable display screen during a phone call, and the call manager determines to display the displayable call content that is associated with the phone call on the front-facing portion of the rollable display screen. In implementations, the call manager can receive one or more various sensor inputs from which the position or proximity of a user relative to the mobile device and the front-facing portion or the rear-facing portion of the rollable display screen can be detected. For example, the call manager can receive a camera image, a gesture input, a proximity sensor input, a motion sensor input, detected audio input, and/or any other types of sensor inputs from which to determine the position or proximity of a user to the device. Similarly, the call manager can determine to display the displayable call content associated with the phone call on the rear-facing portion of the rollable display screen, and then duplicate the displayable call content for display on the rear-facing portion of the rollable display screen.

In one or more implementations, the displayable call content associated with a phone call (e.g., a video call) is streaming video of a remote user on the phone call with the user of the mobile device. The call manager can receive an input indicating intended interaction on the phone call by a second user, such as an additional person in proximity to the mobile phone who wants to join the call. For example, an additional person may want to join the video call on the mobile device with the user, without necessarily having to move from their current position opposite the user of the mobile device (i.e., the additional user is in a position to view the rear-facing portion of the rollable display screen). The call manager can receive the input indicating the intended interaction on the phone call by a second user as one or more of a gesture detected by a rear-facing camera of the mobile device, a proximity sensor input, or a detected audio input from the first user of the mobile device or the remote user on the phone call.

Notably, the detected audio input can be filtered to use only audio cues detected from participants on the phone call that have a context with the call. For example, simply detecting audio from a person (e.g., a child, or passerby) in the general area of the user of the mobile device who is on the phone call will not be determined by the call manager as a person to join the call. However, if the user of the device acknowledges or makes reference to another person in the proximate area (e.g., a colleague, or boss), then the call manager can determine the intended interaction on the phone call with the additional person. The call manager can then duplicate the streaming video of the video call for display on the rear-facing portion of the rollable display screen for viewing and call interaction by the second user. Accordingly, the mobile device with a front-facing camera and a rear-facing camera can accommodate more than one person on a video call utilizing both sides of the rollable display screen on either side of the device, namely taking advantage of rollable display screen configuration with both a front-facing portion and a rear-facing portion of the rollable display screen.

In other implementations, the displayable call content associated with a phone call is real time text (RTT) displayable as a text conversation of the phone call between the user of the mobile device and a remote user on the phone call. The call manager can receive an input indicating intended interaction on the phone call by a second user, such as an additional person in proximity to the mobile phone who wants to join the call. The call manager can receive the input indicating the intended interaction on the phone call by a second user as one or more of a gesture detected by a rear-facing camera, a proximity sensor input, or a keyword detected in the text of the RTT itself. The call manager can then duplicate the RTT for display on the rear-facing portion of the rollable display screen for viewing and call interaction by the second user.

In one or more implementations, the displayable call content is displayable as the phone call between the user of the mobile device and the remote user, and the call manager can receive an input indicating proximity of a second user. For example, the call manager can receive a camera image, a gesture input, a proximity sensor input, a motion sensor input, detected audio input, and/or any other types of sensor inputs from which to determine the position or proximity of a user or another person to the device. The call manager can then initiate to temporarily duplicate the displayable call content for display on the rear-facing portion of the rollable display screen for a viewable preview by the additional person. In this example scenario, the temporary display of the displayable call content can be displayed to the additional person without alerting the remote user on the other end of the phone call. The displayable call content can be temporarily displayed on the rear-facing portion of the rollable display screen so that the additional person can quickly see who is on the call (e.g., the remote user) with the user of the mobile device and/or so that the additional person can indicate whether he or she wants to join the conversation.

In other implementations, the displayable call content is displayable as the phone call between the user of the mobile device and the remote user. The call manager can duplicate the displayable call content associated with the phone call for display on the rear-facing portion of the rollable display screen for viewing and call interaction by a second user, such as described in the implementations above for a video call and/or RTT displayable as a text conversation of the phone call. Additionally, the call manager can initiate to transmit, to a remote device connected for the phone call, a first call video of the phone call with the first user of the mobile device and a second call video of the phone call with the second user for a dual-capture viewfinder view of the phone call at the remote device. For example, the front-facing camera of the mobile device captures the first call video of the first user on the phone call, and the rear-facing camera of the mobile device captures the second call video of the second user on the phone call. The first call video and the second call video can be combined and/or otherwise displayed together at the remote device in a dual-capture viewfinder view for the remote user who is on the phone call with the first user and the second user of the mobile device.

While features and concepts of the described techniques for rollable screen simultaneous display call use can be implemented in any number of different devices, systems, environments, and/or configurations, implementations of the techniques for rollable screen simultaneous display call use are described in the context of the following example devices, systems, and methods.

FIG. 1 illustrates an example system 100 for rollable screen simultaneous display call use, as described herein. The example system 100 includes a mobile device 102, such as a smartphone, mobile phone, wireless device, and/or any other type of wireless device. The mobile device 102 can be implemented with various components, such as a processor system and memory, as well as any number and combination of different components as further described with reference to the example device shown in FIG. 15. In implementations, the mobile device 102 includes various radios for wireless communication with other devices. For example, the mobile device 102 may include a Bluetooth (BT) and/or Bluetooth Low Energy (BLE) transceiver and/or a near field communication (NFC) transceiver. The mobile device 102 may also include a Wi-Fi radio, a GPS radio, and/or any type of device communication interfaces.

The mobile device 102 has a rollable display screen 104 that can be configured in any one of various display states 106 corresponding to respective mobile device form factors 108. For example, the device form factors 108 can include a compact form factor, an expanded form factor, a partial form factor (also referred to as a "peek" form factor), as well as other device form factors. The rollable display screen 104 may be positioned in any incremental display state 106 corresponding to device form factors between the compact form factor and the expanded form factor. In this example system 100, the mobile device 102 is shown in the compact form factor at 110, with the rollable display screen 104 configured in a retracted display state that corresponds to the compact form factor of the device. Further, the mobile device 102 is shown in the expanded form factor at 112, with the rollable display screen 104 configured in an extended display state. The rollable display screen 104 is a flexible display that translates between the retracted display state to the extended display state, and back. In one or more implementations, the rollable display screen 104 is an organic light emitting diode (OLED) display fabricated on a flexible plastic substrate, which allows the flexible display to deform around the device housing.

In implementations, the rollable display screen has a front-facing portion of the display screen and at least one rear-facing portion of the display screen. In alternate implementations, the rollable display screen 104 wraps around both ends of the device housing of the mobile device 102, and the rollable display screen has a first rear-facing portion and a second rear-facing portion of the display screen. A portion of the rollable display screen 104 rotates around the housing of the mobile device 102, such as in the compact form factor of the device, forming a rear-facing portion of the display screen (e.g., relative to the front-facing portion of the display screen shown in the compact form factor at 110 and in the expanded form factor at 112 in the example system 100). In implementations, both the front-facing portion and the rear-facing portion of the rollable display screen 104 can be used to display content, such as related content or content associated with two different applications. In the expanded form factor of the mobile device 102, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

The mobile device 102 includes a slidable display mount 114 that is a powered sliding or translation mechanism (e.g., an actuator, motor, gear assembly, drive screws, etc.) operable to transition the rollable display screen 104 around the surfaces of the device housing, such as between the extended display state where the rollable display screen 104 extends distally from the device housing, and the retracted display state where the rollable display screen 104 corresponds to the compact form factor of the device with the flexible display wrapping around the surfaces of the device housing. In one or more implementations, the rollable display screen 104 may be extended or retracted automatically, such as based on whether content is being displayed on the display screen for viewing, a size of the displayed content, and/or based on the type of displayed content. For example, a user may prefer the mobile device 102 in the compact form factor as shown at 110 for ease of carrying, and then when initiating to playback content for viewing, the rollable display screen 104 automatically extends from the retracted display state to the extended display state for full-screen viewing, as shown at 112 in the expanded form factor of the device.

The mobile device 102 includes various functionality that enables the mobile device to implement different aspects of rollable screen simultaneous display call use, as described herein. In this example system 100, the mobile device 102 includes a call manager 116 that represents functionality (e.g., logic, software, and/or hardware) enabling the automatic function control of the slidable display mount 114 for translating and positioning the rollable display screen 104. The call manager 116 can be implemented as computer instructions stored on computer-readable storage media (e.g., memory of the device), or in any other suitable memory device or electronic data storage, and can be executed by a processor system of the device. Alternatively or in addition, the call manager 116 can be implemented at least partially in firmware and/or at least partially in computer hardware. For example, at least part of the call manager 116 may be executable by a computer processor, and/or at least part of the call manager may be implemented in logic circuitry. In one or more implementations, the call manager 116 may include independent processing, memory, and/or logic components functioning as a computing and/or electronic device integrated with the mobile device 102.

The mobile device 102 can include and implement various device applications 118, such as any type of messaging application (e.g., for a RTT call), email application, video communication application (e.g., for a video call), cellular communication application, music application, gaming application, media application, social platform applications, and/or any other of the many possible types of device applications. Many of the device applications 118 have an associated application user interface 120 that is generated and displayed for user interaction and viewing, such as on the rollable display screen 104 of the mobile device 102. For example, a phone call on the mobile device may also have displayable call content 122 associated with the phone call, and the displayable call content 122 is displayed in the user interface 120 of a cellular communication application (e.g., a device application 118), or similar. In various scenarios, the displayable call content 122 associated with a video call can be streaming video that is received showing a remote user on the call with the user of the mobile device. In other scenarios, the displayable call content 122 that is associated with a phone call may be real time text (RTT), which is displayable as a text conversation version of the phone call between the user of the mobile device and the remote user.

Generally, an application user interface, or any other type of video, image, graphic, and the like is digital image content that is displayable on the rollable display screen 104 of the mobile device. In this example system 100, the call manager 116 can be implemented as a software application or module, such as executable software instructions that are executable with a processor system of the mobile device 102 to implement the techniques and features described herein. As a device application, the call manager 116 may have an associated application user interface 120 that is generated and displayable for user interaction and viewing, such as on the rollable display screen 104 of the mobile device. The rollable display screen 104 can be utilized to display any of various types of content on the mobile device 102. In one or more implementations, the mobile device 102 generates and/or outputs content from a device application 118 and/or operating system of the device, and the content is displayed on the rollable display screen 104. For example, a media application may receive streaming content from a remote server via a communication network for display on the rollable display screen. In this example system 100, the call manager 116 can determine (or receive or be provided input) that content is displayed for viewing on the front-facing portion of the rollable display screen 104, such as any type of media, gaming, image, and/or any other type of viewable and/or interactive content.

In this example, the mobile device 102 includes camera devices 124, such as a front-facing camera on a first side of the mobile device (e.g., relative to the front-facing portion of the rollable display screen), and a rear-facing camera on a second, opposite side of the mobile device (e.g., relative to the rear-facing portion of the rollable display screen. The camera devices 124 can capture and/or detect users who are proximate the mobile device, to include the user of the device and others who may be included in a phone call on the device, and can capture gesture inputs by the users which are communicated to the call manager 116 as interaction and/or sensor inputs 126. The mobile device 102 also includes device sensors 128, such as any type of a proximity sensor, motion sensor, audio sensor, environment sensor, as well as any number and combination of different device sensors as further described with reference to the example device shown in FIG. 15.

Any of the devices, applications, modules, servers, and/or services described herein can communicate via a communication network, such as for data communication between the mobile device 102 and other communication and/or computing devices. The communication network can be implemented to include a wired and/or a wireless network, may be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, mobile phone provider, and/or Internet service provider.

In one or more implementations, the mobile device 102 may also be configured in other device form factors 108, such as a partial form factor, which is further shown and described with reference to FIG. 2. As noted above, the partial form factor may also be referred to as a "peek" form factor, and in this configuration, the rollable display screen 104 translates down (e.g., in an opposite direction of the extended display state). This display state provides for an unobstructed sensory view of various device sensors and/or components that are otherwise hidden behind the rollable display screen 104 in both the compact form factor (retracted display state) and expanded form factor (extended display state). For example, device sensors such as a front-facing camera, environment sensors (e.g., for motion, sound, lighting, etc.), a proximity sensor, and/or a phone earpiece speaker can all be integrated in the mobile device 102 under the rollable display screen 104, and the slidable display mount 114 translates the display screen over or above the sensors. These under-the-display screen sensors are then exposed or visible for use in the sensor display state of the rollable display screen 104, which corresponds to the partial form factor of the mobile device 102. Although generally described throughout this disclosure as the call manager 116 initiating and/or automatically controlling the configuration and/or reconfiguration of the mobile device form factors 108, a user of the device may initiate to configure the device in any form factor and/or display state of the rollable display screen, and override configuration settings of the call manager.

Figure 2:
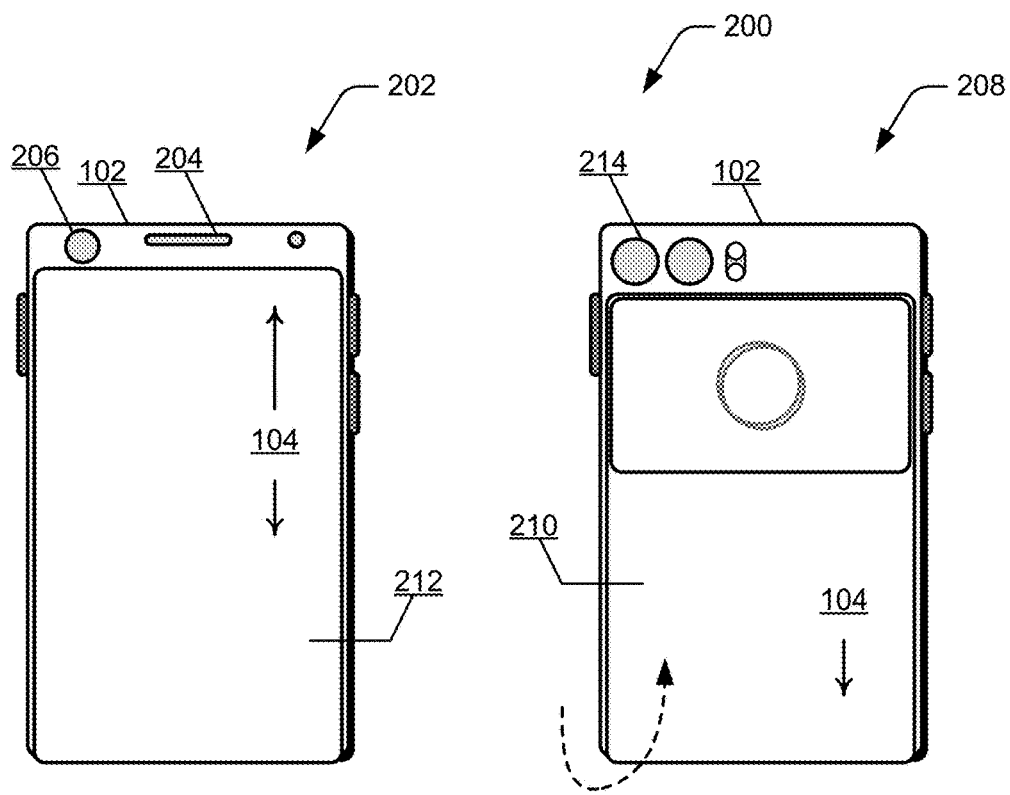
FIG. 2 further illustrates example views of a mobile device, which supports rollable screen simultaneous display call use in accordance with one or more implementations as described herein.

FIG. 2 further illustrates example views 200 of the mobile device in aspects of rollable screen simultaneous display call use, as described herein. In these example views 200, the mobile device 102 is shown in a front view 202 in the partial form factor (e.g., also referred to as the "peek" form factor), with the rollable display screen 104 configured in the sensor display state. In this configuration, the rollable display screen 104 translates down (e.g., in an opposite direction of the extended display state). This sensor display state provides for an unobstructed sensory view of various device sensors 204, a front-facing camera 206 (e.g., a camera device 124), and/or components that are otherwise hidden behind the rollable display screen 104 in both the compact form factor (retracted display state) and expanded form factor (extended display state). For example, the front-facing camera 206 and the device sensors 204, such as environment sensors (e.g., for motion, sound, lighting, etc.), a proximity sensor, and/or phone earpiece speaker can all be integrated in the mobile device 102 under the rollable display screen 104, and the slidable display mount 114 translates the display screen over or above the sensors. These under-the-display screen sensors are then exposed or visible for use in the sensor display state of the rollable display screen 104 that corresponds to the partial form factor of the mobile device 102.

In these example views 200, the mobile device 102 is also shown in a back view 208 in the partial form factor of the device, with the rollable display screen 104 configured in the sensor display state. The rollable display screen 104 is translated by the slidable display mount 114 around the device housing, and forms the rear-facing portion 210 of the display screen, which wraps around the end of mobile device as a continuation of the front-facing portion 212 of the rollable display screen. The mobile device 102 also includes a rear-facing camera 214 (e.g., a camera device 124), or multiple rear-facing cameras.

Figure 3:
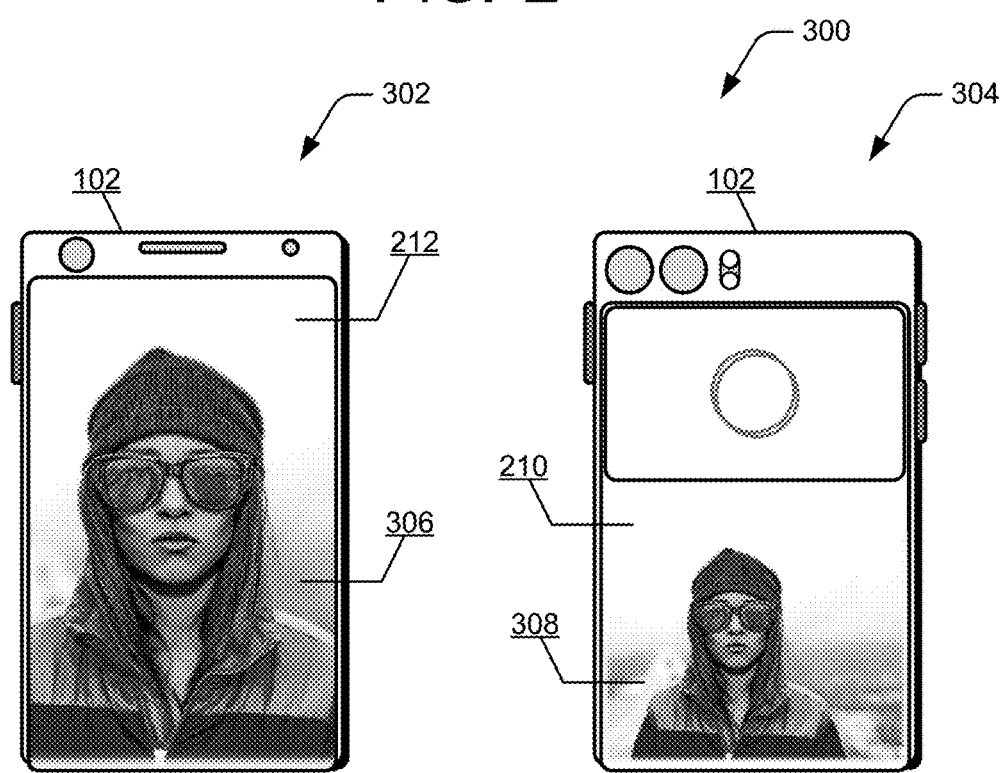
FIG. 3 illustrates an example use scenario of the mobile device, as related to rollable screen simultaneous display call use in accordance with one or more implementations as described herein.

FIG. 3 illustrates an example use scenario 300 of the mobile device in aspects of rollable screen simultaneous display call use, as described herein. In this example, the mobile device 102 is shown in both a front view 302 and a back view 304 in the partial form factor (e.g., also referred to as the "peek" form factor), with the rollable display screen 104 configured in the sensor display state. This example use scenario 300 illustrates that a phone call on the device may also have associated displayable call content 122, such as for a video call, in which case streaming video 306 is received showing a remote user on the phone call with the user of the mobile device. The call manager 116 can detect that the user of the mobile device is in a position to view the front-facing portion 212 of the rollable display screen 104 during a phone call, and the call manager determines to display the streaming video 306 on the front-facing portion 212 of the rollable display screen. Similarly, the call manager 116 can determine to display the streaming video 306 that is associated with the phone call on the rear-facing portion 210 of the rollable display screen, and then duplicate the displayable call content (e.g., the streaming video at 308) for display on the rear-facing portion 210 of the rollable display screen. Alternatively, either one of the front-facing portion 212 or the rear-facing portion 210 of the rollable display screen 104 can be turned off while the other portion of the display screen is utilized to display the displayable call content 122 (e.g., the streaming video 306) that is associated with a phone call on the device.

Figure 4:
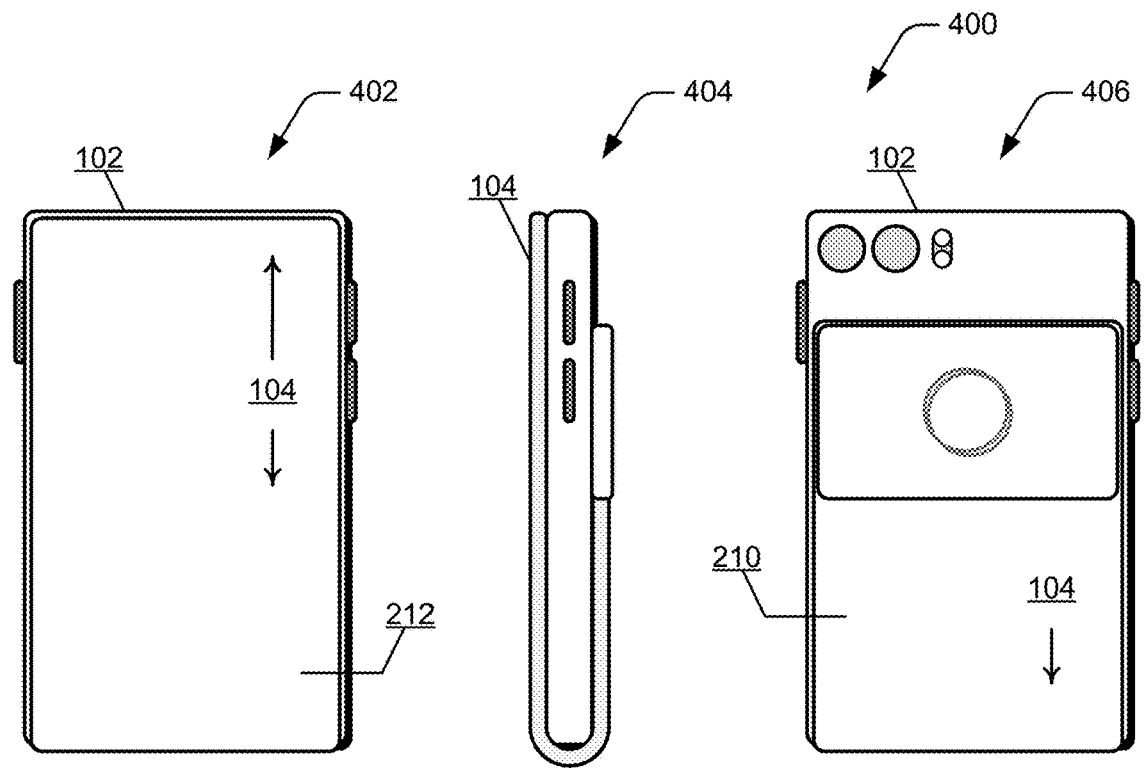
FIG. 4 further illustrates example views of the mobile device, which supports rollable screen simultaneous display call use in accordance with one or more implementations as described herein.

FIG. 4 further illustrates example views 400 of the mobile device in aspects of rollable screen simultaneous display call use, as described herein. In these example views 400, the mobile device 102 is shown in a front view 402, a side view 404, and a back view 406 in the compact form factor, with the rollable display screen 104 configured in the retracted display state. In this configuration, a portion of the rollable display screen 104 rotates around the housing of the mobile device 102, forming the rear-facing portion 210 of the display screen (e.g., relative to the front-facing portion 212 of the display screen). In implementations, both the front-facing portion 212 and the rear-facing portion 210 of the rollable display screen 104 can be used to display content, such as the displayable call content 122, other related content, or content associated with different applications.

Figure 5:
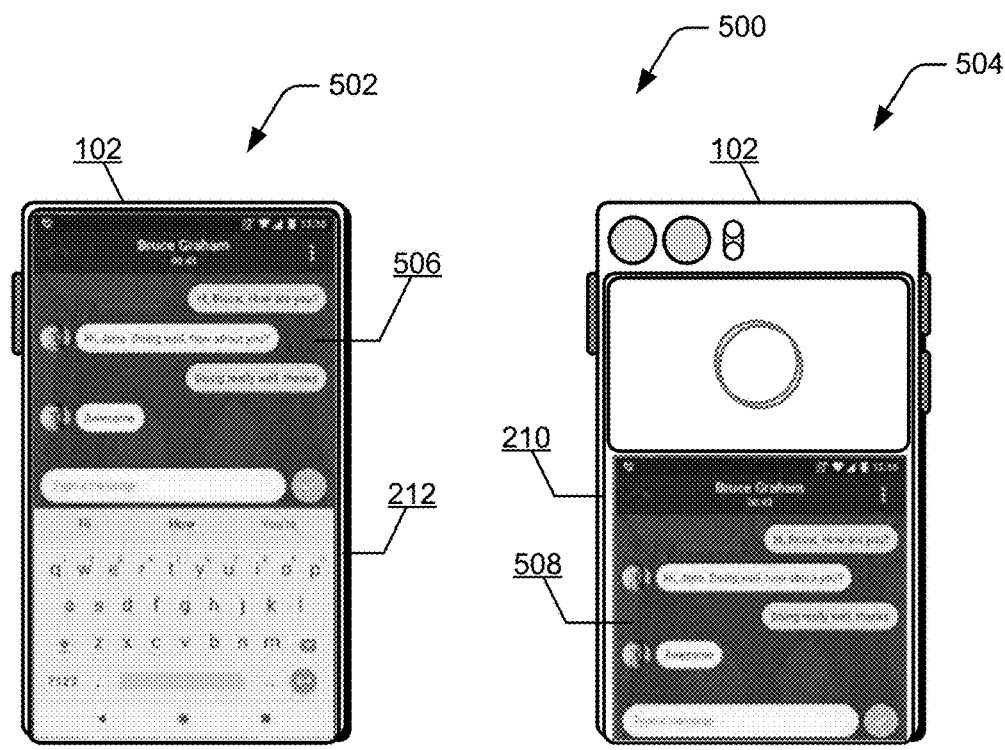
FIG. 5 illustrates another example use scenario of the mobile device, as related to rollable screen simultaneous display call use in accordance with one or more implementations as described herein.

FIG. 5 illustrates another example use scenario 500 of the mobile device, as related to rollable screen simultaneous display call use, as described herein. In this example use scenario 500, the mobile device 102 is shown in both a front view 502 and a back view 504 in the compact form factor with the rollable display screen 104 configured in the retracted display state. This example use scenario 300 illustrates that a phone call on the device may also have associated displayable call content 122, such as real time text (RTT) 506, which is displayable as a text conversation version of the phone call between the user of the mobile device and the remote user. The call manager 116 can detect that the user of the mobile device is in a position to view the front-facing portion 212 of the rollable display screen 104 during a phone call, and the call manager determines to display the RTT 506 on the front-facing portion 212 of the rollable display screen. Similarly, the call manager 116 can determine to display the RTT 506 that is associated with the phone call on the rear-facing portion 210 of the rollable display screen, and then duplicate the displayable call content (e.g., the RTT at 508) for display on the rear-facing portion 210 of the rollable display screen. Alternatively, either one of the front-facing portion 212 or the rear-facing portion 210 of the rollable display screen 104 can be turned off while the other portion of the display screen is utilized to display the displayable call content 122 (e.g., the RTT 506) that is associated with a phone call on the device.

Figure 6:
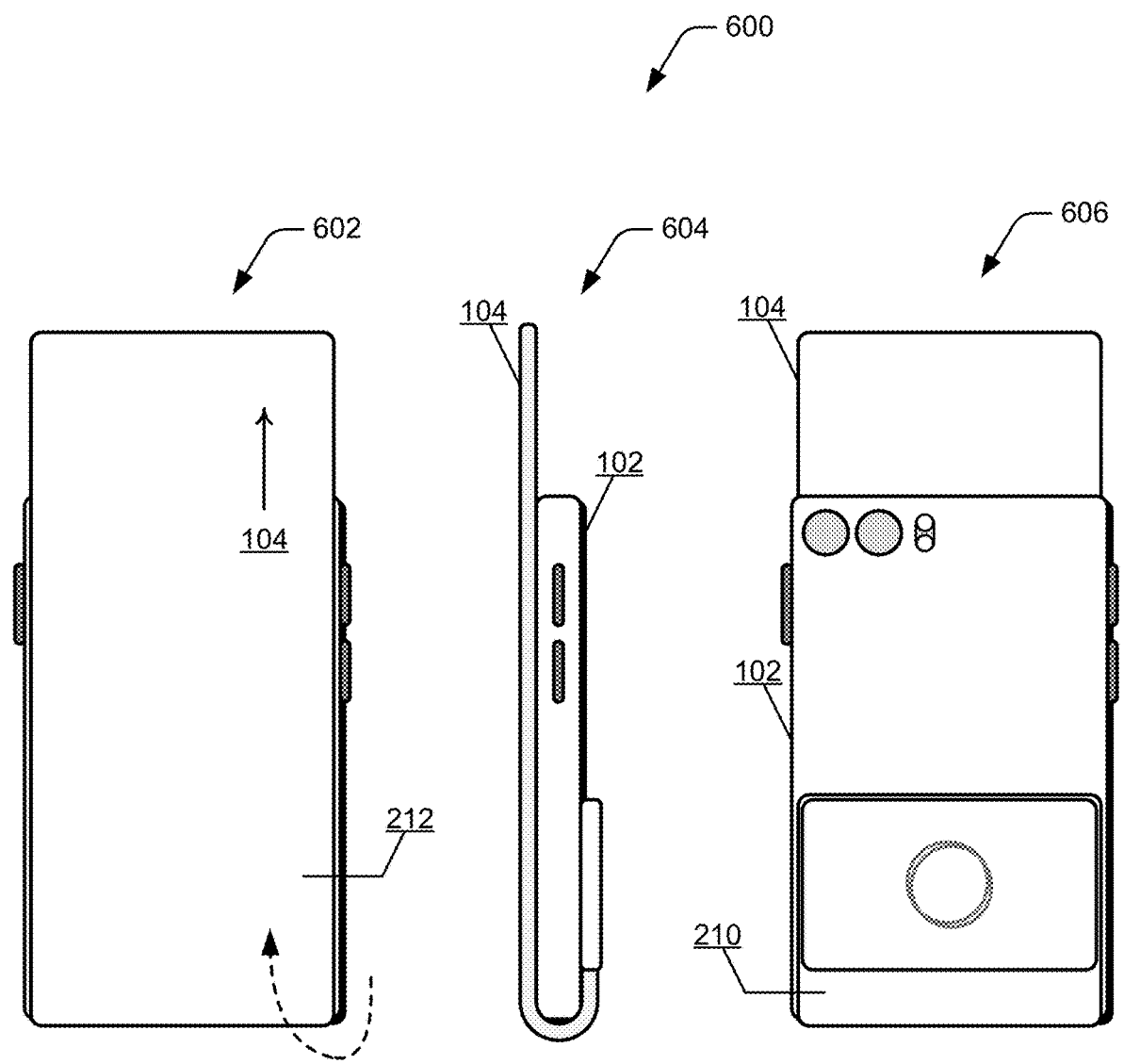
FIG. 6 further illustrates example views of the mobile device, which supports rollable screen simultaneous display call use in accordance with one or more implementations as described herein.

FIG. 6 further illustrates example views 600 of the mobile device in aspects of rollable screen simultaneous display call use, as described herein. In these example views 600, the mobile device 102 is shown in a front view 602, a side view 604, and a back view 606 in the expanded form factor, with the rollable display screen 104 configured in the extended display state. In this configuration, the rear-facing portion 210 of the rollable display screen 104 rotates around the device housing and becomes part of the front-facing portion 212 of the display screen. Notably, the viewable display area of the rollable display screen 104 varies as the display screen is translated from the sensor display state to the retracted display state to the extended display state, and back. As illustrated in the figures, the slidable display mount 114 translates the rollable display screen 104 around the device housing to change the overall length of the flexible display as viewed from the front of the mobile device 102 (e.g., as shown in the front view 502). The slidable display mount 114 also translates the rollable display screen 104 in an opposite direction around the device housing to the retracted display state in the compact form factor of the device, and more of the rollable display screen 104 is viewable as the rear-facing portion 210 of the display. Content, such as any type of graphics and images, can be displayed on any section of the rollable display screen 104, including on the front-facing portion 212, on the rear-facing portion 210, and/or on the curved end portion of the display screen.

Figure 7:
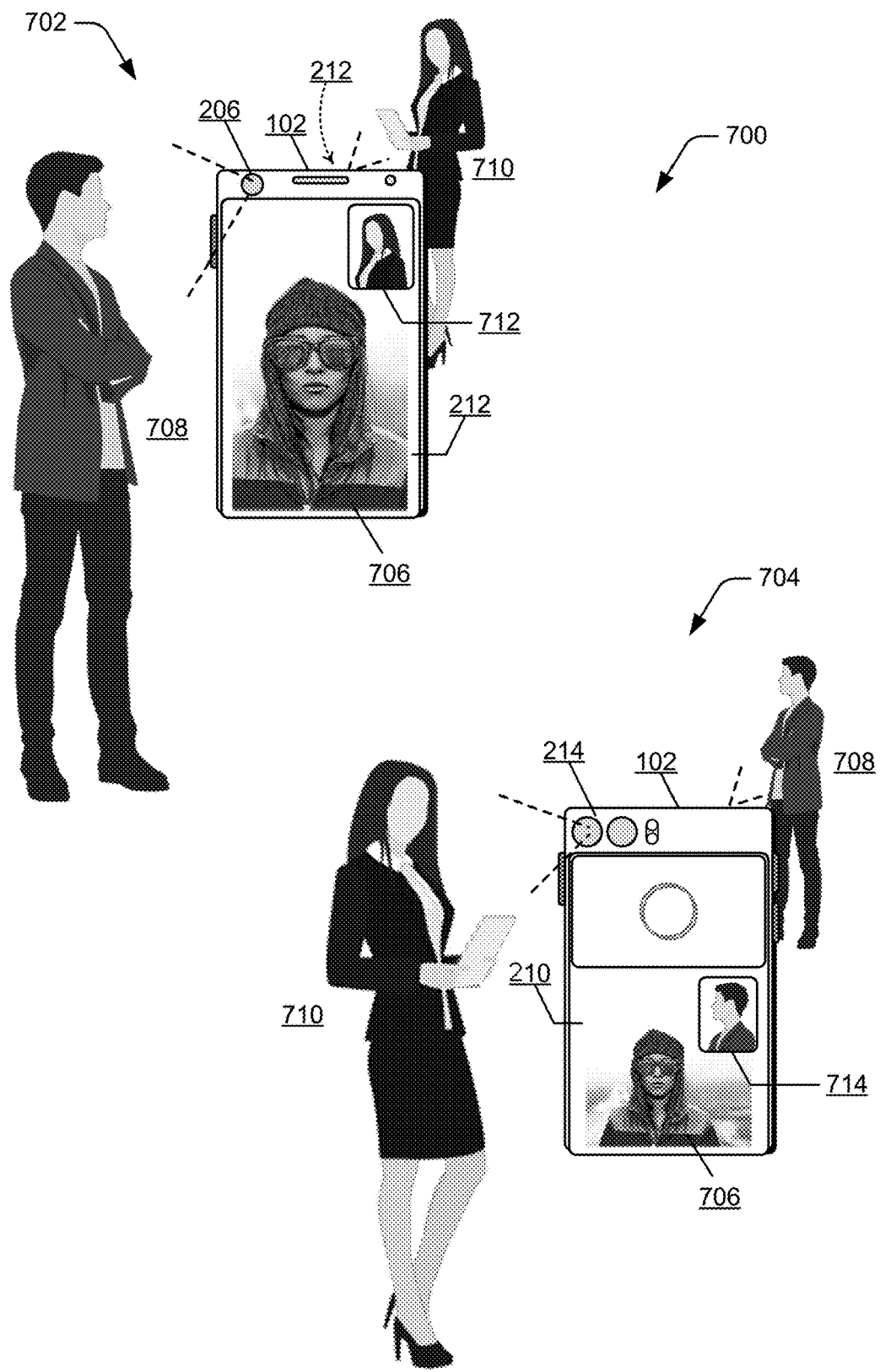
FIG. 7 illustrates another example use scenario of the mobile device, as related to rollable screen simultaneous display call use in accordance with one or more implementations as described herein.

FIG. 7 illustrates another example use scenario 700 of the mobile device, as related to rollable screen simultaneous display call use, as described herein. In this example, the mobile device 102 is shown in a front view 702 and in a back view 704. This example use scenario 700 illustrates described techniques that allow for simultaneous utilization of the front-facing portion 212 that is viewable on a first side of the mobile device 102 and the rear-facing portion 210 is viewable on a second side of the mobile device. The displayable call content 122 is streaming video associated with a video call on the mobile device, and the streaming video shows a remote user 706 on the phone call with the user 708 of the mobile device.

The call manager 116 can detect that the user 708 of the mobile device 102 is in a position to view the front-facing portion 212 of the rollable display screen 104 during the phone call, and the call manager 116 determines to display the displayable call content 122 (e.g., streaming video in this example use scenario 700) that is associated with the phone call on the front-facing portion 212 of the rollable display screen. In implementations, the call manager 116 can receive one or more various sensor inputs 126 from which the position or proximity of a user relative to the mobile device 102 and the front-facing portion 212 or the rear-facing portion 210 of the rollable display screen can be detected. For example, the call manager 116 can receive a camera image, a gesture input, a proximity sensor input, a motion sensor input, detected audio input, and/or any other types of interaction and/or sensor inputs 126 from which to determine the position or proximity of a user to the device. Similarly, the call manager 116 can determine to display the displayable call content 122 associated with the phone call on the rear-facing portion 210 of the rollable display screen 104, and then duplicate the displayable call content for display on the rear-facing portion of the rollable display screen.

In this example use scenario 700, the user 708 of the mobile device 102 is on a video call with the remote user 706, and the user 708 is interfacing on the video call with the front-facing portion 212 of the rollable display screen 104. Another person (e.g., a second user 710) is also on the video call with the user 708 of the mobile device and the remote user 706, and the second user 710 is interfacing on the video call with the rear-facing portion 210 of the rollable display screen 104. The rear-facing camera 214 captures the call video 712 of the second user 710, which is displayed on the front-facing portion 212 of the display screen in a viewfinder view format for the first user 708. Similarly, the front-facing camera 206 captures the all video 714 of the user 708, which is displayed on the rear-facing portion 210 of the display screen in a viewfinder view format for the second user 710.

Figure 8:
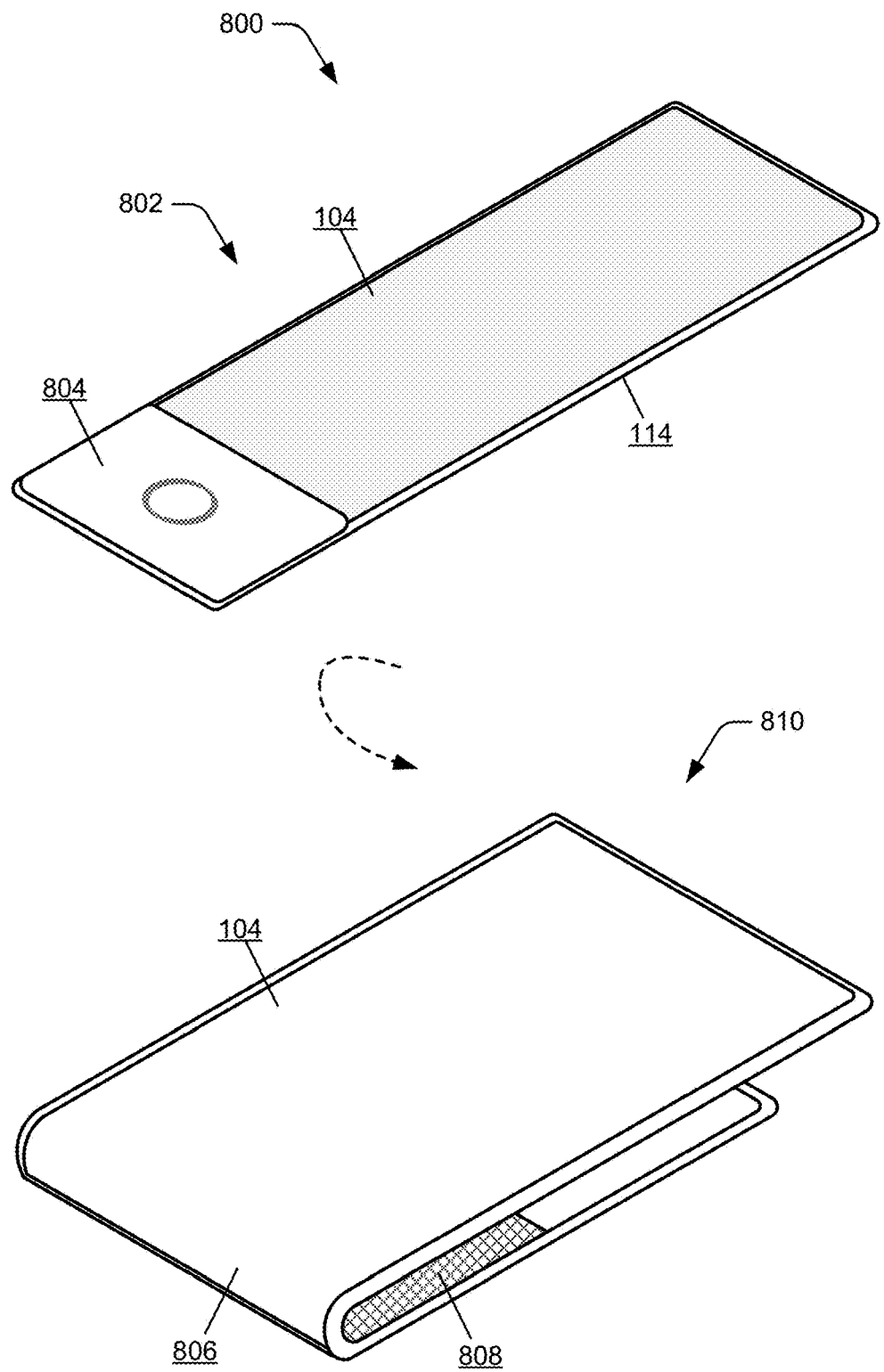
FIG. 8 illustrates example views of a rollable display screen and mounting assembly, which supports rollable screen simultaneous display call use in accordance with one or more implementations as described herein.

FIG. 8 illustrates example views 800 of the rollable display screen and the slidable display mount of the mobile device in aspects of rollable screen simultaneous display call use, as described herein. In these example views 800, the rollable display screen 104 integrated with the slidable display mount 114 is shown configured at 802, along with a backplate 804. A display roller mechanism can be implemented to facilitate the flexible display and mounting assembly (e.g., the rollable display screen 104 and the slidable display mount 114) wrapping around the device housing. As described herein, part of the rollable display screen 104

(e.g., a first rear-facing portion of the display screen) can wrap around a first end of mobile device as a continuation of the front-facing portion of the rollable display screen, and another part of the rollable display screen 104 (e.g., a second rear-facing portion of the rollable display screen) can wrap around a second end of the mobile device as a further continuation of the front-facing portion of the rollable display screen.

The display roller mechanism includes a rotor positioned within the curvilinear section 806 of the flexible display and mounting assembly to facilitate translation of the rollable display screen 104 in the various display states. In one or more implementations, the slidable display mount 114 includes a substrate that includes a flexible portion 808, which allows the flexible display and mounting assembly to wrap and deform around the device housing. As shown at 810, the rollable display screen 104 and the slidable display mount 114 are wrapped around to form the curvilinear section 806 of the flexible display, along with two linear sections of the display as the front-facing portion and the rear-facing portion of the rollable display screen. As shown in the example views 800, a cross section of the rollable display screen 104 and the slidable display mount 114 forms a J-shape or U-shape with the curvilinear section 806 of the display.

Example methods 900, 1000, 1100, 1200, 1300, and 1400 are described with reference to respective FIGS. 9-14 in accordance with one or more implementations for rollable screen simultaneous display call use, as described herein. Generally, any services, components, modules, managers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
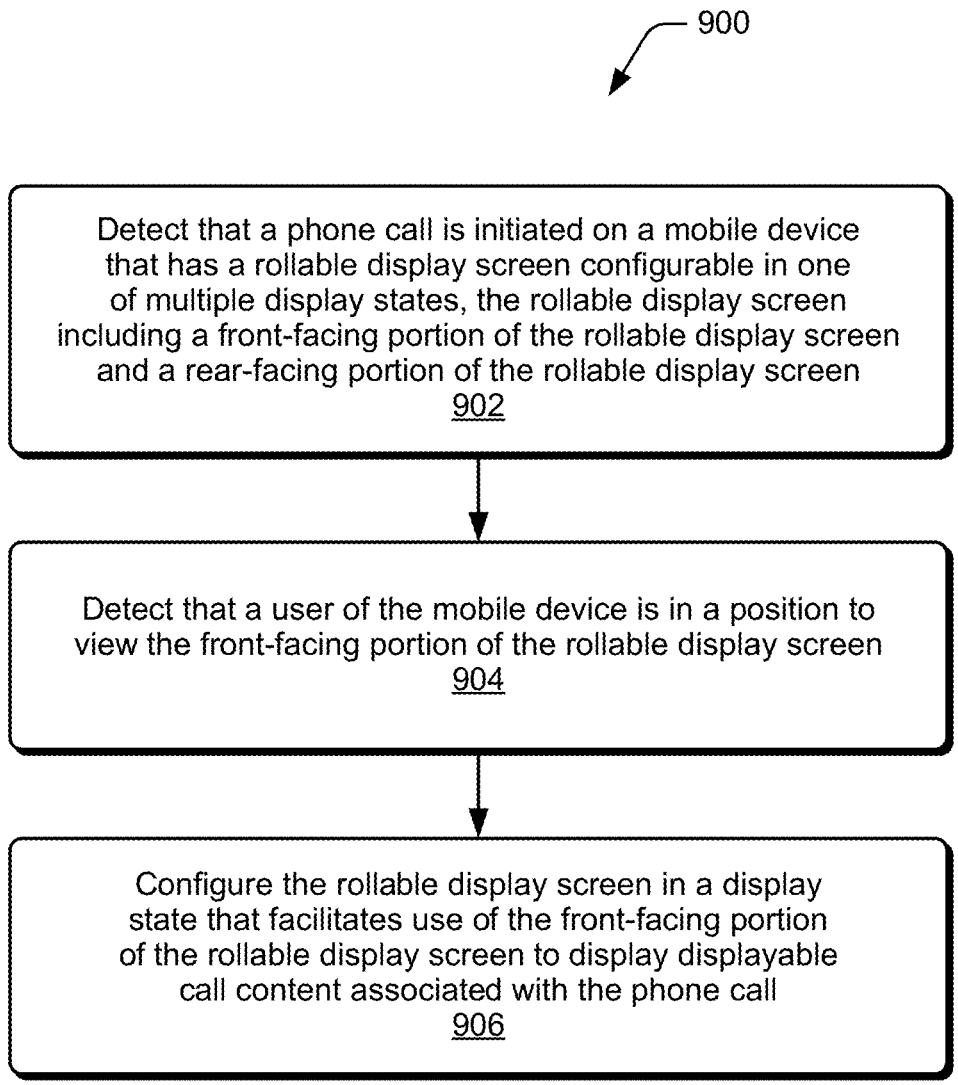
FIGS. 9-14 illustrate example methods for rollable screen simultaneous display call use in accordance with one or more implementations of the techniques described herein.

FIG. 9 illustrates example method(s) 900 for rollable screen simultaneous display call use. The order in which the method is described is not intended to be construed as a limitation, and any number or combination of the described method operations can be performed in any order to perform a method, or an alternate method.

At 902, a phone call is detected when initiated on a mobile device that has a rollable display screen configurable in one of multiple display states, the rollable display screen including a front-facing portion of the rollable display screen and a rear-facing portion of the rollable display screen. For example, the call manager 116 detects a phone call that is initiated on the mobile device 102, which has the rollable display screen 104 configurable in one of multiple display states 106, and the rollable display screen includes the front-facing portion 212 of the rollable display screen and the rear-facing portion 210 of the rollable display screen. In implementations, the phone call can be detected by the call manager 116 as an incoming phone call to the mobile device 102, or detected as an outgoing phone call initiated by a user of the mobile device.

At 904, a user of the mobile device is detected in a position to view the front-facing portion of the rollable display screen. For example, the call manager 116 detects that a user of the mobile device 102 is in a position to view the front-facing portion 212 of the rollable display screen 104 during a phone call, and the call manager 116 can determine to display the displayable call content 122 that is associated with the phone call on the front-facing portion 212 of the rollable display screen.

At 906, the rollable display screen is configured in a display state that facilitates use of the front-facing portion of the rollable display screen to display displayable call content associated with the phone call. For example, the call manager 116 initiates operation of the slidable display mount 114 that configures the rollable display screen 104 corresponding to a partial form factor of the mobile device that facilitates utilization of the front-facing camera 206 for the phone call. The front-facing portion 212 of the rollable display screen 104 is utilized to display the displayable call content 122 that is associated with the phone call, where the displayable call content 122 is one of streaming video of a remote user on the phone call, or real time text (RTT) displayable as a text conversation version of the phone call between the user of the mobile device and the remote user.

Figure 10:
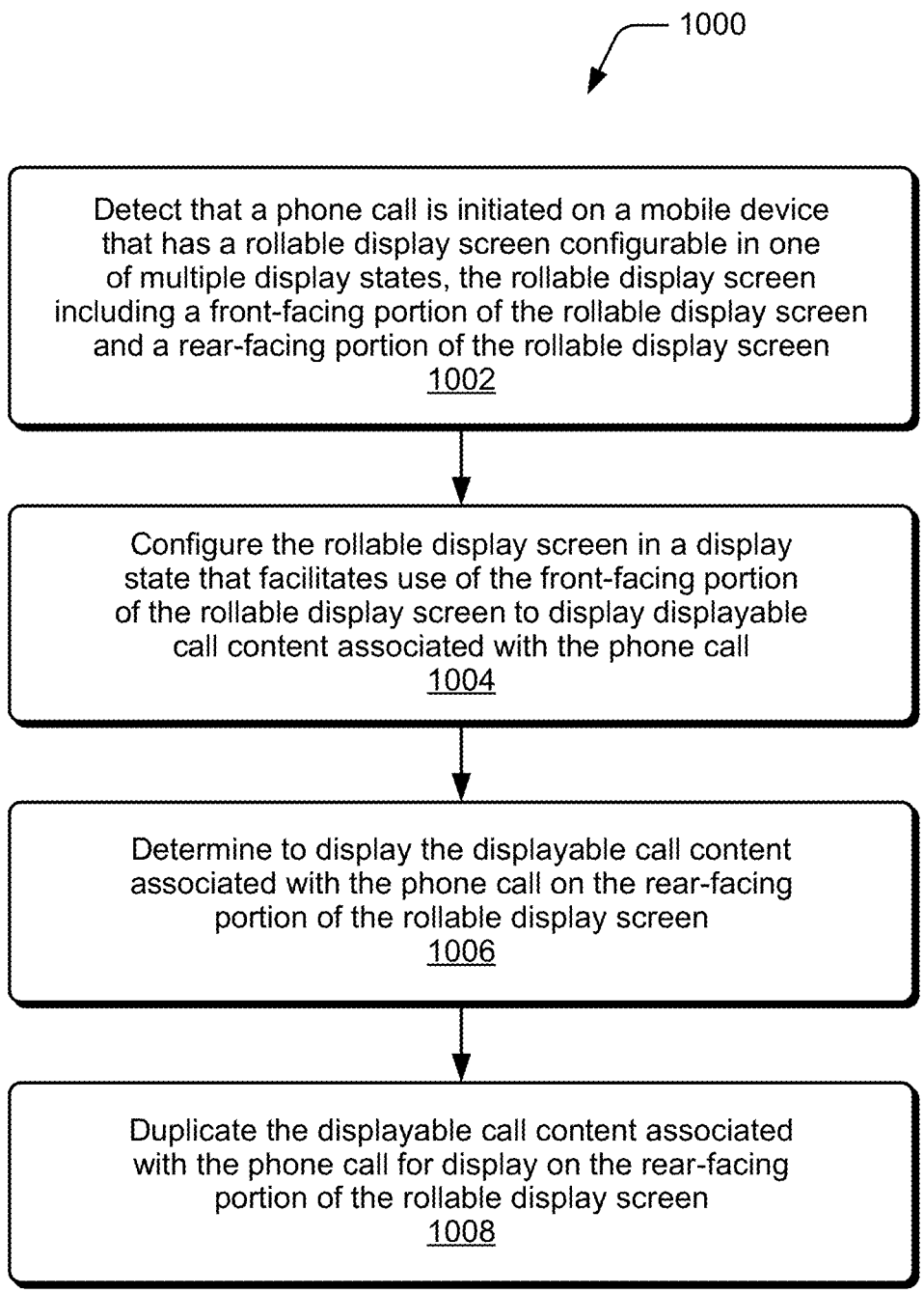

FIG. 10 illustrates example method(s) 1000 for rollable screen simultaneous display call use. The order in which the method is described is not intended to be construed as a limitation, and any number or combination of the described method operations can be performed in any order to perform a method, or an alternate method.

At 1002, a phone call is detected when initiated on a mobile device that has a rollable display screen configurable in one of multiple display states, the rollable display screen including a front-facing portion of the rollable display screen and a rear-facing portion of the rollable display screen. For example, the call manager 116 detects a phone call that is initiated on the mobile device 102, which has the rollable display screen 104 configurable in one of multiple display states 106, and the rollable display screen includes the front-facing portion 212 of the rollable display screen and the rear-facing portion 210 of the rollable display screen. In implementations, the phone call can be detected by the call manager 116 as an incoming phone call to the mobile device 102, or detected as an outgoing phone call initiated by a user of the mobile device.

At 1004, the rollable display screen is configured in a display state that facilitates use of the front-facing portion of the rollable display screen to display displayable call content associated with the phone call. For example, the call manager 116 initiates operation of the slidable display mount 114 that configures the rollable display screen 104 corresponding to a partial form factor of the mobile device that facilitates utilization of the front-facing camera 206 for the phone call. The front-facing portion 212 of the rollable display screen 104 is utilized to display the displayable call content 122 that is associated with the phone call, where the displayable call content 122 is one of streaming video of a remote user on the phone call, or real time text (RTT) displayable as a text conversation version of the phone call between the user of the mobile device and the remote user.

At 1006, a determination is made to display the displayable call content associated with the phone call on the rear-facing portion of the rollable display screen. For example, the call manager 116 determines to display the displayable call content 122 associated with the phone call on the rear-facing portion 210 of the rollable display screen 104. At 1008, the displayable call content associated with the phone call is duplicated for display on the rear-facing portion of the rollable display screen. For example, the call manager 116 duplicates the displayable call content 122 for display on the rear-facing portion 210 of the rollable display screen 104.

Figure 11:
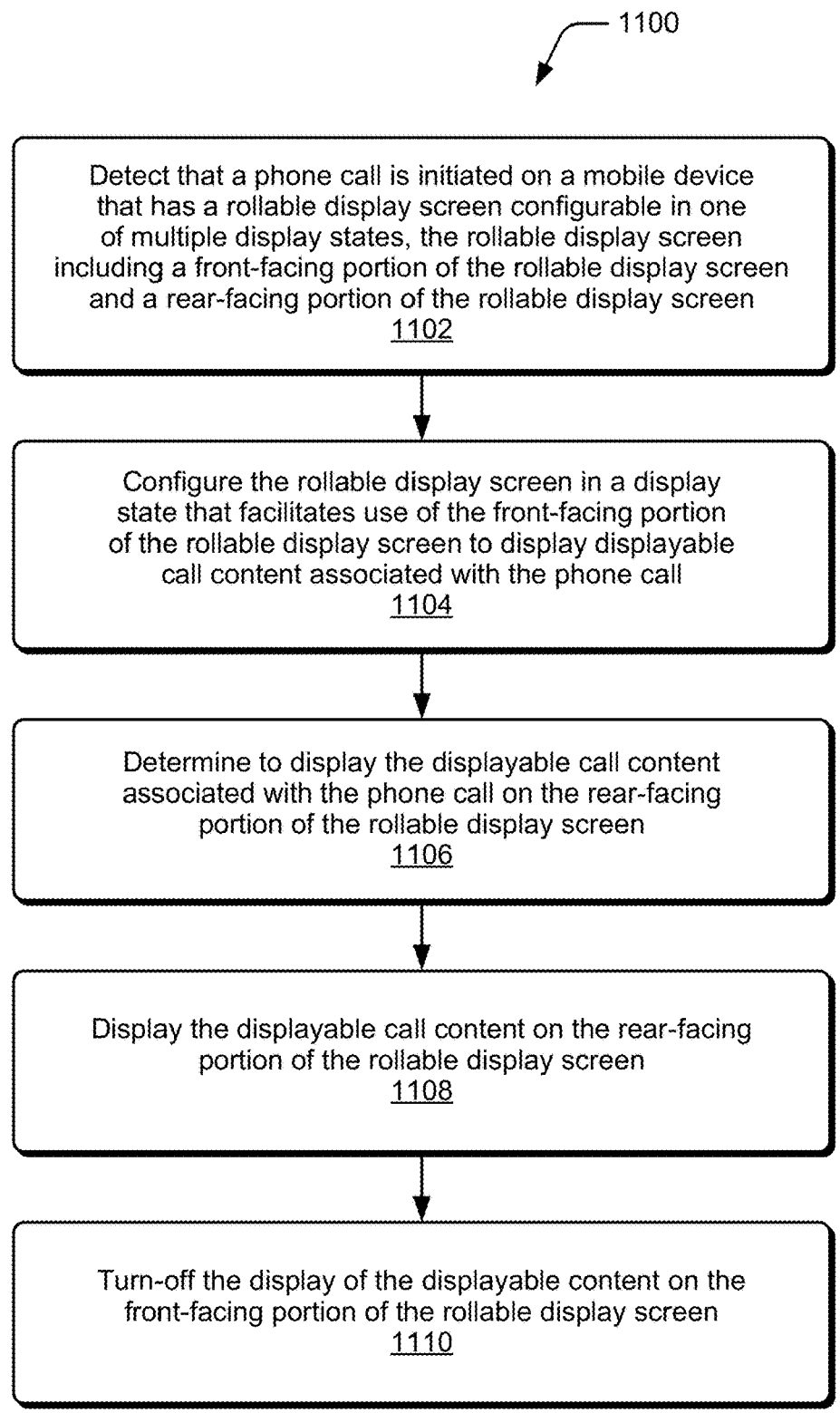

FIG. 11 illustrates example method(s) 1100 for rollable screen simultaneous display call use. The order in which the method is described is not intended to be construed as a limitation, and any number or combination of the described method operations can be performed in any order to perform a method, or an alternate method.

At 1102, a phone call is detected when initiated on a mobile device that has a rollable display screen configurable in one of multiple display states, the rollable display screen including a front-facing portion of the rollable display screen and a rear-facing portion of the rollable display screen. For example, the call manager 116 detects a phone call that is initiated on the mobile device 102, which has the rollable display screen 104 configurable in one of multiple display states 106, and the rollable display screen includes the front-facing portion 212 of the rollable display screen and the rear-facing portion 210 of the rollable display screen. In implementations, the phone call can be detected by the call manager 116 as an incoming phone call to the mobile device 102, or detected as an outgoing phone call initiated by a user of the mobile device.

At 1104, the rollable display screen is configured in a display state that facilitates use of the front-facing portion of the rollable display screen to display displayable call content associated with the phone call. For example, the call manager 116 initiates operation of the slidable display mount 114 that configures the rollable display screen 104 corresponding to a partial form factor of the mobile device that facilitates utilization of the front-facing camera 206 for the phone call. The front-facing portion 212 of the rollable display screen 104 is utilized to display the displayable call content 122 that is associated with the phone call, where the displayable call content 122 is one of streaming video of a remote user on the phone call, or real time text (RTT) displayable as a text conversation version of the phone call between the user of the mobile device and the remote user.

At 1106, a determination is made to display the displayable call content associated with the phone call on the rear-facing portion of the rollable display screen. For example, the call manager 116 determines to display the displayable call content 122 associated with the phone call on the rear-facing portion 210 of the rollable display screen 104. At 1108, the displayable call content is displayed on the rear-facing portion of the rollable display screen. For example, the call manager 116 initiates the displayable call content 122 associated with the phone call being displayed on the rear-facing portion 210 of the rollable display screen 104. At 1110, the display of the displayable content on the front-facing portion of the rollable display screen is turned-off. For example, the call manager 116 can turn-off either one of the front-facing portion 212 or the rear-facing portion 210 of the rollable display screen 104 while the other portion of the display screen is utilized to display the displayable call content 122 that is associated with a phone call on the device.

Figure 12:
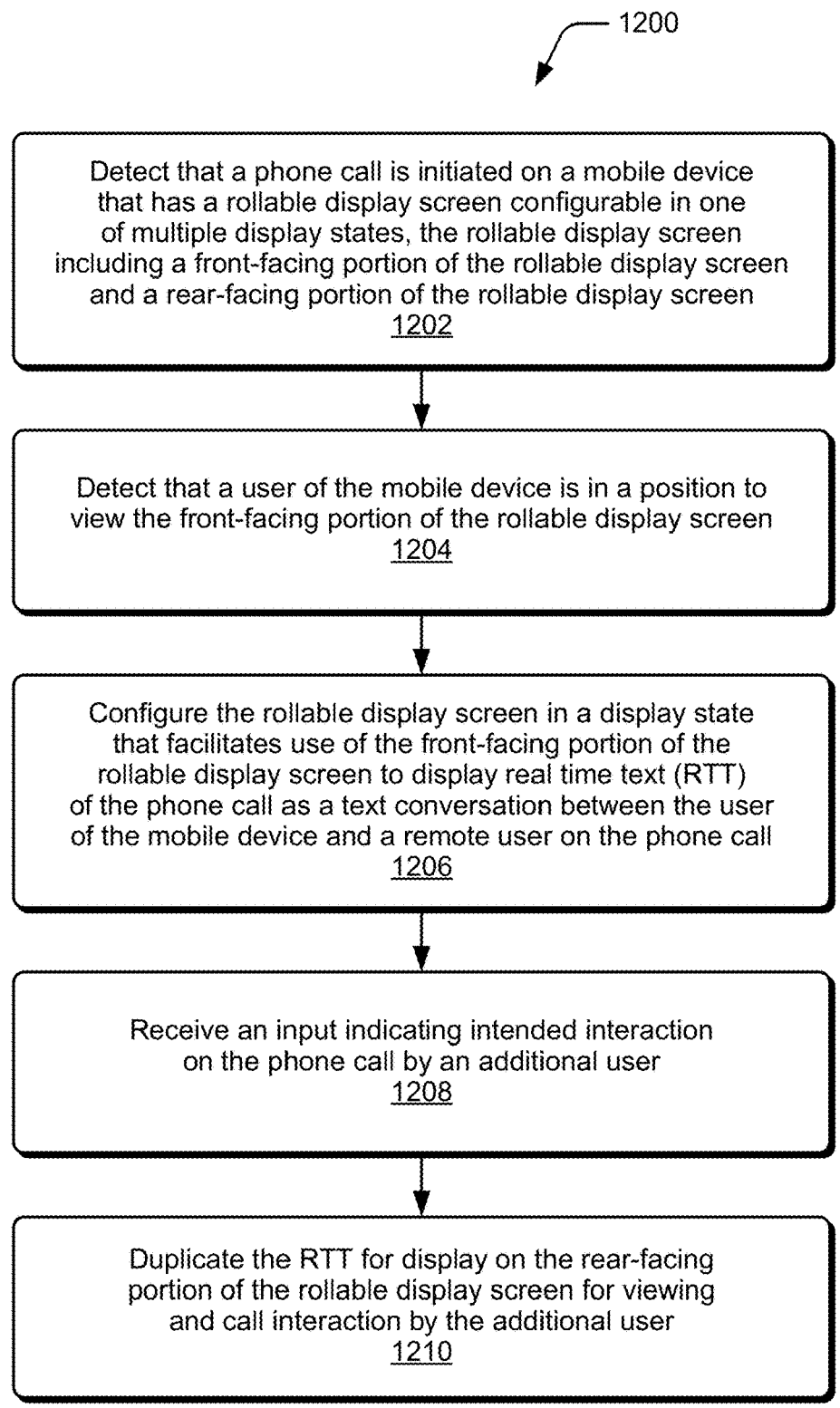

FIG. 12 illustrates example method(s) 1200 for rollable screen simultaneous display call use. The order in which the method is described is not intended to be construed as a limitation, and any number or combination of the described method operations can be performed in any order to perform a method, or an alternate method.

At 1202, a phone call is detected when initiated on a mobile device that has a rollable display screen configurable in one of multiple display states, the rollable display screen including a front-facing portion of the rollable display screen and a rear-facing portion of the rollable display screen. For example, the call manager 116 detects a phone call that is initiated on the mobile device 102, which has the rollable display screen 104 configurable in one of multiple display states 106, and the rollable display screen includes the front-facing portion 212 of the rollable display screen and the rear-facing portion 210 of the rollable display screen. In implementations, the phone call can be detected by the call manager 116 as an incoming phone call to the mobile device 102, or detected as an outgoing phone call initiated by a user of the mobile device.

At 1204, a user of the mobile device is detected in a position to view the front-facing portion of the rollable display screen. For example, the call manager 116 detects that a user of the mobile device 102 is in a position to view the front-facing portion 212 of the rollable display screen 104 during a phone call, and the call manager 116 can determine to display the displayable call content 122 that is associated with the phone call on the front-facing portion 212 of the rollable display screen.

At 1206, the rollable display screen is configured in a display state that facilitates use of the front-facing portion of the rollable display screen to display real time text (RTT) of the phone call as a text conversation between the user of the mobile device and a remote user on the phone call. For example, the call manager 116 initiates operation of the slidable display mount 114 that configures the rollable display screen 104 corresponding to a form factor of the mobile device, and the front-facing portion 212 of the rollable display screen 104 is utilized to display real time text (RTT) as a text conversation version of the phone call between the user of the mobile device and the remote user.

At 1208, an input is received indicating intended interaction on the phone call by an additional user. For example, the call manager 116 receives an interaction and/or sensor input 126 as a gesture detected by the rear-facing camera 214, a proximity sensor input, and/or as a keyword detected in the text of the RTT itself. At 1210, the RTT is duplicated for display on the rear-facing portion of the rollable display screen for viewing and call interaction by the additional user. For example, the call manager 116 duplicates the RTT for display on the rear-facing portion 210 of the rollable display screen 104 for viewing and call interaction by the second user.

Figure 13:
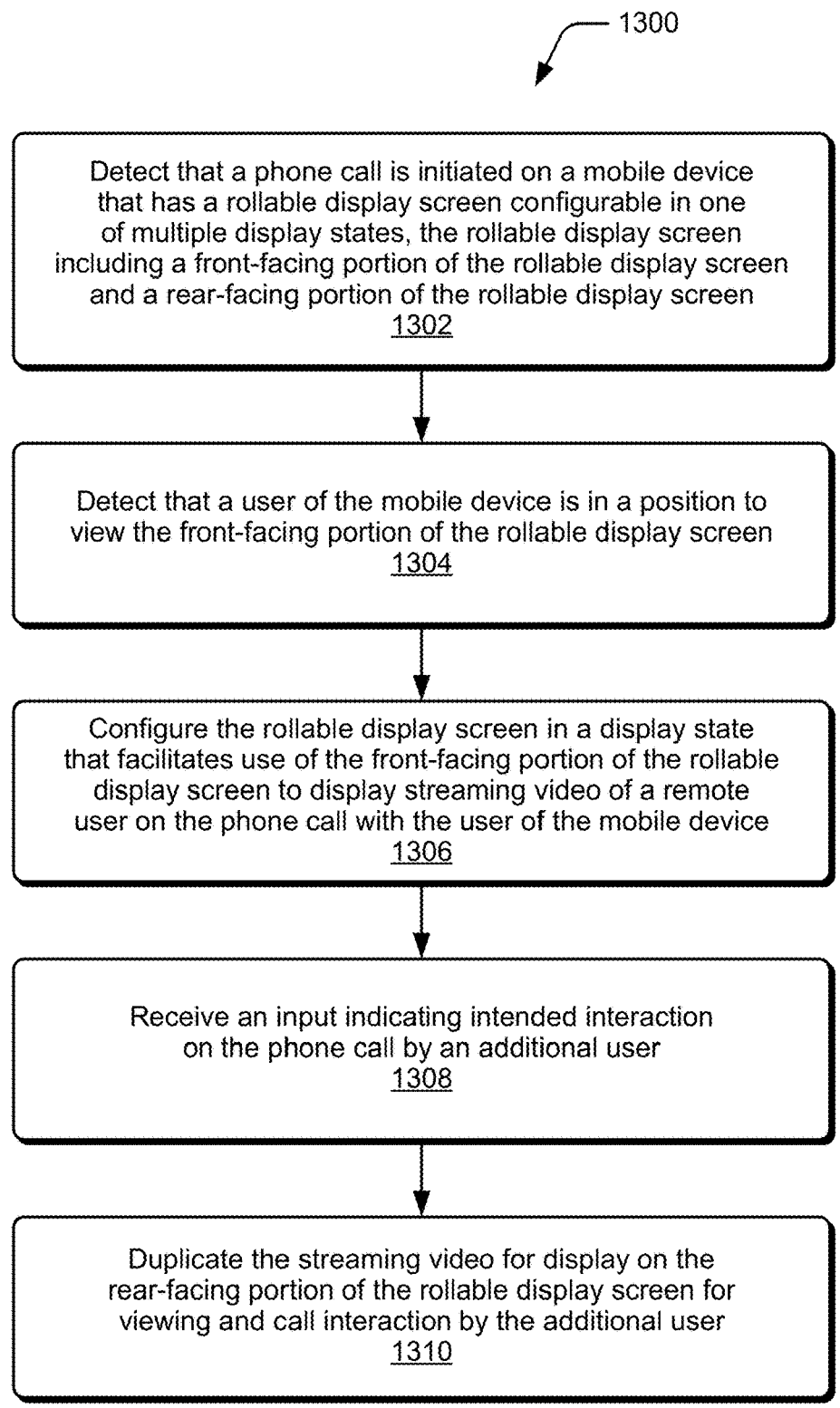

FIG. 13 illustrates example method(s) 1300 for rollable screen simultaneous display call use. The order in which the method is described is not intended to be construed as a limitation, and any number or combination of the described method operations can be performed in any order to perform a method, or an alternate method.

At 1302, a phone call is detected when initiated on a mobile device that has a rollable display screen configurable in one of multiple display states, the rollable display screen including a front-facing portion of the rollable display screen and a rear-facing portion of the rollable display screen. For example, the call manager 116 detects a phone call that is initiated on the mobile device 102, which has the rollable display screen 104 configurable in one of multiple display states 106, and the rollable display screen includes the front-facing portion 212 of the rollable display screen and the rear-facing portion 210 of the rollable display screen. In implementations, the phone call can be detected by the call manager 116 as an incoming phone call to the mobile device 102, or detected as an outgoing phone call initiated by a user of the mobile device.

At 1304, a user of the mobile device is detected in a position to view the front-facing portion of the rollable display screen. For example, the call manager 116 detects that a user of the mobile device 102 is in a position to view the front-facing portion 212 of the rollable display screen 104 during a phone call, and the call manager 116 can determine to display the displayable call content 122 that is associated with the phone call on the front-facing portion 212 of the rollable display screen.

At 1306, the rollable display screen is configured in a display state that facilitates use of the front-facing portion of the rollable display screen to display streaming video of a remote user on the phone call with the user of the mobile device. For example, the call manager 116 initiates operation of the slidable display mount 114 that configures the rollable display screen 104 corresponding to a form factor of the mobile device, and the front-facing portion 212 of the rollable display screen 104 is utilized to display streaming video of a remote user on the phone call with the user of the mobile device.

At 1308, an input is received indicating intended interaction on the phone call by an additional user. For example, the call manager 116 receives an interaction and/or sensor input 126 as a gesture detected by the rear-facing camera 214, a proximity sensor input, and/or a detected audio input from the first user of the mobile device or the remote user on the phone call. At 1310, the streaming video is duplicated for display on the rear-facing portion of the rollable display screen for viewing and call interaction by the additional user. For example, the call manager 116 duplicates the streaming video of the video call for display on the rear-facing portion 210 of the rollable display screen 104 for viewing and call interaction by the second user.

Figure 14:
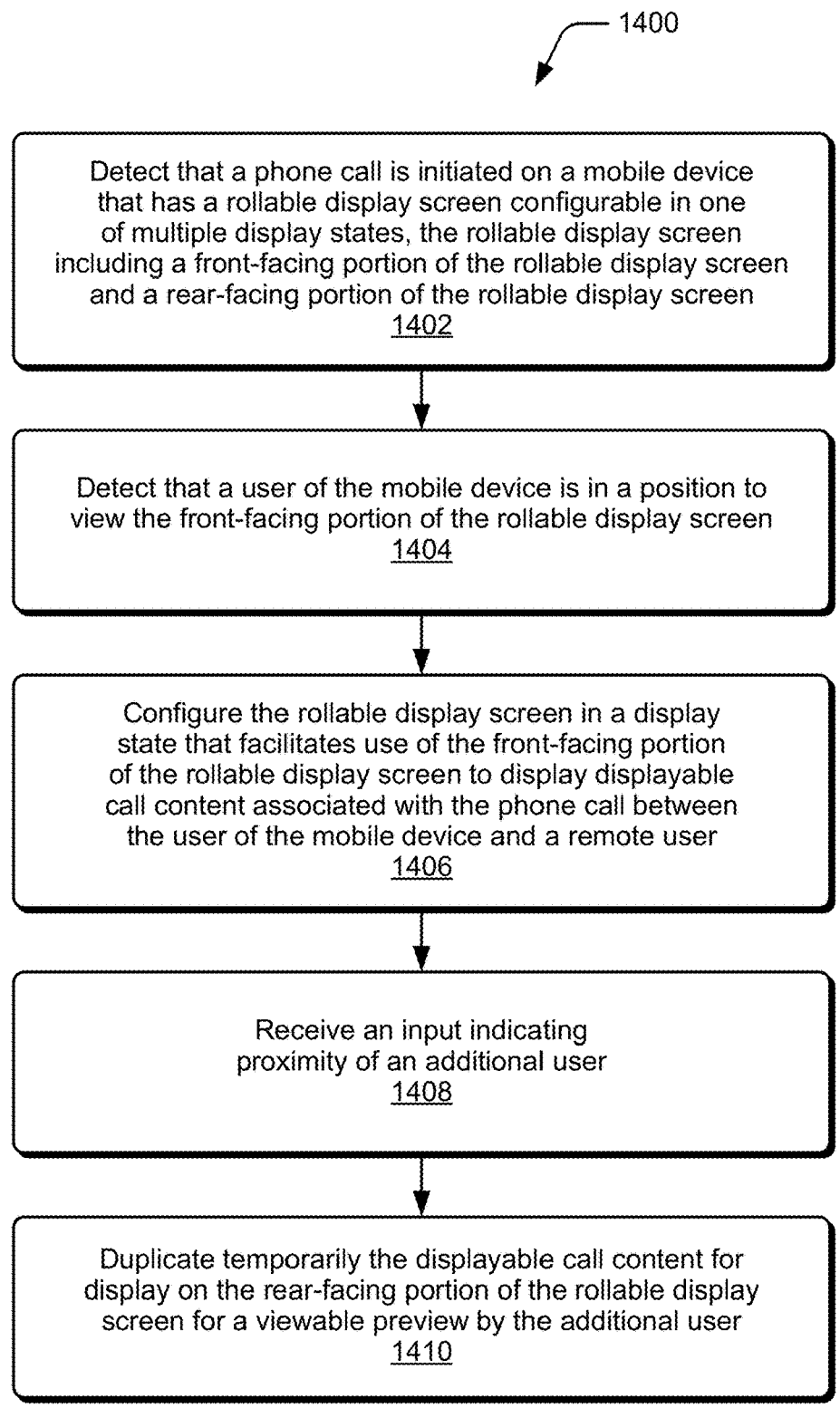

FIG. 14 illustrates example method(s) 1400 for rollable screen simultaneous display call use. The order in which the method is described is not intended to be construed as a limitation, and any number or combination of the described method operations can be performed in any order to perform a method, or an alternate method.

At 1402, a phone call is detected when initiated on a mobile device that has a rollable display screen configurable in one of multiple display states, the rollable display screen including a front-facing portion of the rollable display screen and a rear-facing portion of the rollable display screen. For example, the call manager 116 detects a phone call that is initiated on the mobile device 102, which has the rollable display screen 104 configurable in one of multiple display states 106, and the rollable display screen includes the front-facing portion 212 of the rollable display screen and the rear-facing portion 210 of the rollable display screen. In implementations, the phone call can be detected by the call manager 116 as an incoming phone call to the mobile device 102, or detected as an outgoing phone call initiated by a user of the mobile device.

At 1404, a user of the mobile device is detected in a position to view the front-facing portion of the rollable display screen. For example, the call manager 116 detects that a user of the mobile device 102 is in a position to view the front-facing portion 212 of the rollable display screen 104 during a phone call, and the call manager 116 can determine to display the displayable call content 122 that is associated with the phone call on the front-facing portion 212 of the rollable display screen.

At 1406, the rollable display screen is configured in a display state that facilitates use of the front-facing portion of the rollable display screen to display displayable call content associated with the phone call between the user of the mobile device and a remote user. For example, the call manager 116 initiates operation of the slidable display mount 114 that configures the rollable display screen 104 corresponding to a form factor of the mobile device, and the front-facing portion 212 of the rollable display screen 104 is utilized to display the displayable call content 122 that is associated with the phone call between the user of the mobile device 102 and a remote user.

At 1408, an input is received indicating proximity of an additional user. For example, the call manager 116 receives an interaction and/or sensor input 126 that indicates the proximity of an additional user to the mobile device 102. The call manager 116 can receive a camera image, a gesture input, a proximity sensor input, a motion sensor input, detected audio input, and/or any other types of sensor inputs from which to determine the position or proximity of a user or another person to the device.

At 1410, the displayable call content is duplicated temporarily for display on the rear-facing portion of the rollable display screen for a viewable preview by the additional user. For example, the call manager 116 initiates to temporarily duplicate the displayable call content 122 for display on the rear-facing portion 210 of the rollable display screen 104 for a viewable preview by the additional person. In this example scenario, the temporary display of the displayable call content 122 is displayed to the additional person without alerting the remote user on the other end of the phone call. The displayable call content 122 can be temporarily displayed on the rear-facing portion 210 of the rollable display screen 104 so that the additional person can quickly see who is on the call (e.g., the remote user) with the user of the mobile device 102 and/or so that the additional person can indicate whether he or she wants to join the conversation.

Figure 15:
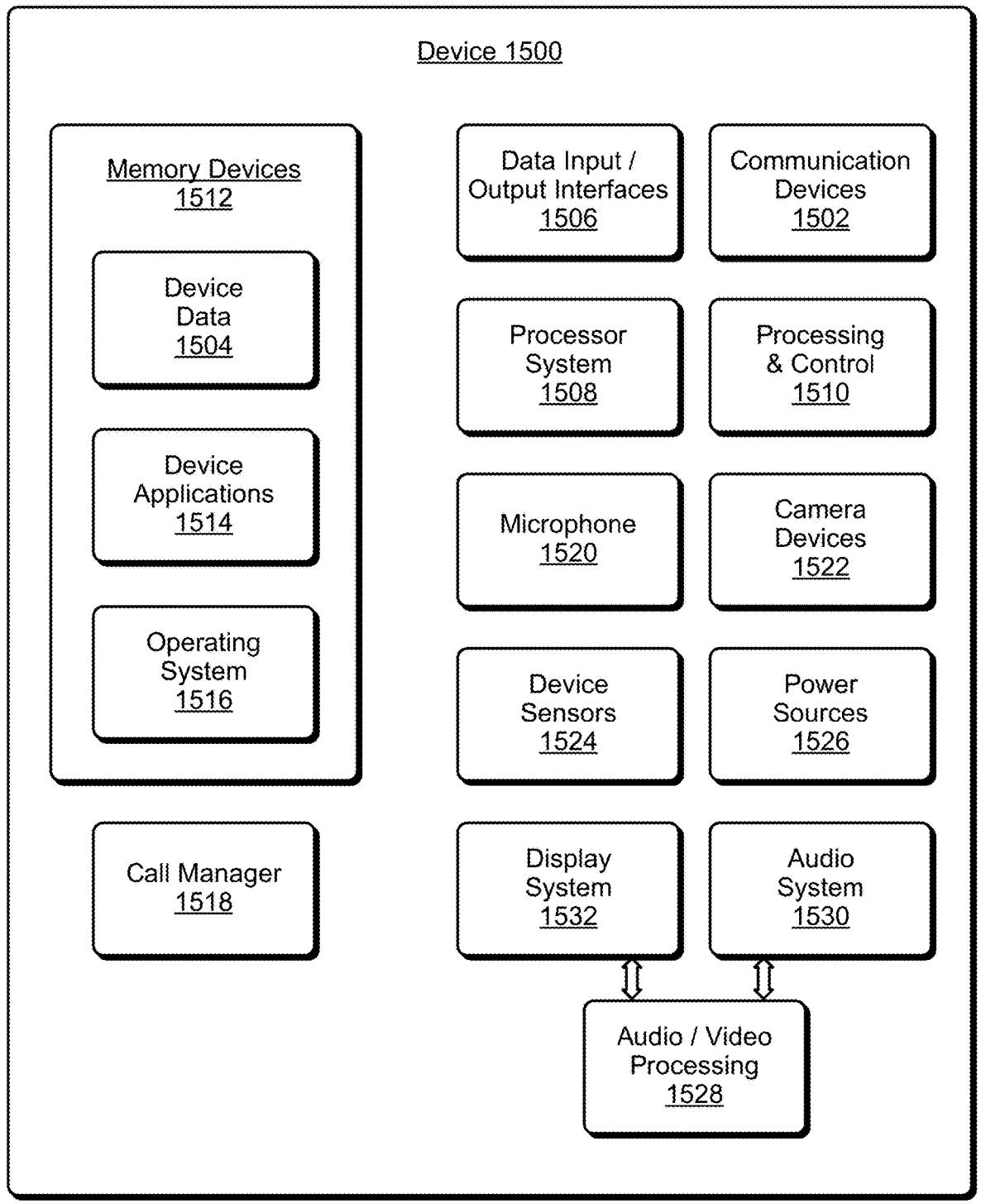
FIG. 15 illustrates various components of an example device that can be used to implement the techniques for rollable screen simultaneous display call use as described herein.

FIG. 15 illustrates various components of an example device 1500, which can implement aspects of the techniques and features for rollable screen simultaneous display call use, as described herein. The example device 1500 can be implemented as any of the devices described with reference to the previous FIGS. 1-14, such as any type of a wireless device, mobile device, mobile phone, flip phone, client device, companion device, paired device, display device, tablet, computing, communication, entertainment, gaming, media playback, and/or any other type of computing and/or electronic device. For example, the mobile device 102 described with reference to FIGS. 1-14 may be implemented as the example device 1500.

The example device 1500 can include various, different communication devices 1502 that enable wired and/or wireless communication of device data 1504 with other devices. The device data 1504 can include any of the various devices data and content that is generated, processed, determined, received, stored, and/or communicated from one computing device to another. Generally, the device data 1504 can include any form of audio, video, image, graphics, and/or electronic data that is generated by applications executing on a device. The communication devices 1502 can also include transceivers for cellular phone communication and/or for any type of network data communication.

The example device 1500 can also include various, different types of data input/output ((I/O) interfaces 1506, such as data network interfaces that provide connection and/or communication links between the devices, data networks, and other devices. The I/O interfaces 1506 can be used to couple the device to any type of components, peripherals, and/or accessory devices, such as a computer input device that may be integrated with the example device 1500. The I/O interfaces 1506 may also include data input ports via which any type of data, information, media content, communications, messages, and/or inputs can be received, such as user inputs to the device, as well as any type of audio, video, image, graphics, and/or electronic data received from any content and/or data source.

The example device 1500 includes a processor system 1508 of one or more processors (e.g., any of microprocessors, controllers, and the like) and/or a processor and memory system implemented as a system-on-chip (SoC) that processes computer-executable instructions. The processor system 1508 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1510. The example device 1500 may also include any type of a system bus or other data and command transfer system that couples the various components within the device. A system bus can include any one or combination of different bus structures and architectures, as well as control and data lines.

The example device 1500 also includes memory and/or memory devices 1512 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1512 include volatile memory and non-volatile memory, fixed and removable media devices, and any suitable memory device or electronic data storage that maintains data for computing device access. The memory devices 1512 can include various implementations of random-access memory (RAM), read-only memory (ROM), flash memory, and other types of storage media in various memory device configurations. The example device 1500 may also include a mass storage media device.

The memory devices 1512 (e.g., as computer-readable storage memory) provide data storage mechanisms, such as to store the device data 1504, other types of information and/or electronic data, and various device applications 1514 (e.g., software applications and/or modules). For example, an operating system 1516 can be maintained as software instructions with a memory device 1512 and executed by the processor system 1508 as a software application. The device applications 1514 may also include a device manager, such as any form of a control application, software application, signal-processing and control module, code that is specific to a particular device, a hardware abstraction layer for a particular device, and so on.

In this example, the device 1500 includes a call manager 1518 that implements various aspects of the described features and techniques described herein. The call manager 1518 can be implemented with hardware components and/or in software as one of the device applications 1514, such as when the example device 1500 is implemented as the mobile device 102 described with reference to FIGS. 1-14. An example of the call manager 1518 is the call manager 116 implemented in the mobile device 102, such as a software application and/or as hardware components in the wireless device. In implementations, the call manager 1518 may include independent processing, memory, and logic components as a computing and/or electronic device integrated with the example device 1500.

The example device 1500 can also include a microphone 1520 and/or camera devices 1522, as well as device sensors 1524, including proximity sensors and/or motion sensors, such as may be implemented as components of an inertial measurement unit (IMU). The device sensors 1524 can be implemented with various motion sensors, such as a gyroscope, an accelerometer, and/or other types of motion sensors to sense motion of the device. The motion sensors can generate sensor data vectors having three-dimensional parameters (e.g., rotational vectors in x, y, and z-axis coordinates) indicating location, position, acceleration, rotational speed, and/or orientation of the device. The example device 1500 can also include one or more power sources 1526, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 1500 can also include an audio and/or video processing system 1528 that generates audio data for an audio system 1530 and/or generates display data for a display system 1532. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1500. Alternatively, the audio system and/or the display system are external, peripheral components to the example device.

Although implementations of rollable screen simultaneous display call use have been described in language specific to features and/or methods, the appended claims are not necessarily limited to the specific features or methods described. Rather, the specific features and methods are disclosed as example implementations of rollable screen simultaneous display call use, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A mobile device, comprising a rollable display screen configurable in one of multiple display states, including a front-facing portion of the rollable display screen and a rear-facing portion of the rollable display screen; a call manager implemented at least partially in computer hardware and configured to: detect that a phone call is initiated and displayable call content is associated with the phone call; determine to display the displayable call content associated with the phone call on the front-facing portion of the rollable display screen; and initiate to configure the rollable display screen in a display state that facilitates use of the front-facing portion of the rollable display screen to display the displayable call content associated with the phone call.

Alternatively or in addition to the above described mobile device, any one or combination of: the displayable call content is determined for display on the front-facing portion of the rollable display screen based on a user of the mobile device detected in a position to view the front-facing portion of the rollable display screen. The call manager is configured to initiate operation of a slidable display mount that configures the rollable display screen corresponding to a partial form factor of the mobile device that facilitates utilization of a front-facing camera for the phone call. The displayable call content is one of streaming video of a remote user on the phone call, or real time text (RTT) displayable as a text conversation between a user of the mobile device and the remote user. The call manager is configured to determine to display the displayable call content associated with the phone call on the rear-facing portion of the rollable display screen; and duplicate the displayable call content associated with the phone call for display on the rear-facing portion of the rollable display screen. The call manager is configured to determine to display the displayable call content associated with the phone call on the rear-facing portion of the rollable display screen; initiate to display the displayable call content on the rear-facing portion of the rollable display screen; and turn off the display of the displayable content on the front-facing portion of the rollable display screen. The displayable call content is real time text (RTT) displayable as a text conversation between a first user of the mobile device and a remote user on the phone call; and the call manager is configured to receive an input indicating intended interaction on the phone call by a second user; and duplicate the RTT for display on the rear-facing portion of the rollable display screen for viewing and call interaction by the second user. The input includes at least one of a gesture detected by a rear-facing camera, a proximity sensor input, or a keyword detected in the RTT. The displayable call content is streaming video of a remote user on the phone call with a first user of the mobile device; and the call manager is configured to receive an input indicating intended interaction on the phone call by a second user; and duplicate the streaming video for display on the rear-facing portion of the rollable display screen for viewing and call interaction by the second user. The input includes at least one of a gesture detected by a rear-facing camera, a proximity sensor input, or a detected audio input from the first user of the mobile device or the remote user on the phone call. The displayable call content is displayable as the phone call between a first user of the mobile device and a remote user; the call manager is configured to receive an input indicating proximity of a second user; and initiate to temporarily duplicate the displayable call content for display on the rear-facing portion of the rollable display screen for a viewable preview by the second user. The displayable call content is displayable as the phone call between a first user of the mobile device and a remote user; the call manager is configured to duplicate the displayable call content associated with the phone call for display on the rear-facing portion of the rollable display screen for viewing and call interaction by a second user; and initiate to transmit, to a remote device connected for the phone call, a first call video of the phone call with the first user and a second call video of the phone call with the second user for a dual-capture viewfinder view of the phone call at the remote device.

A method, comprising detecting that a phone call is initiated on a mobile device that has a rollable display screen configurable in one of multiple display states, the rollable display screen including a front-facing portion of the rollable display screen and a rear-facing portion of the rollable display screen; detecting that a user of the mobile device is in a position to view the front-facing portion of the rollable display screen; and configuring the rollable display screen in a display state that facilitates use of the front-facing portion of the rollable display screen to display displayable call content associated with the phone call.

Alternatively or in addition to the above described method, any one or combination of: the method further comprising determining to display the displayable call content associated with the phone call on the rear-facing portion of the rollable display screen; and duplicating the displayable call content associated with the phone call for display on the rear-facing portion of the rollable display screen. The method further comprising: determining to display the displayable call content associated with the phone call on the rear-facing portion of the rollable display screen; displaying the displayable call content on the rear-facing portion of the rollable display screen; and turning-off the display of the displayable content on the front-facing portion of the rollable display screen. The displayable call content is real time text (RTT) displayable as a text conversation between the user of the mobile device and a remote user on the phone call; and the method further comprising receiving an input indicating intended interaction on the phone call by an additional user; and duplicating the RTT for display on the rear-facing portion of the rollable display screen for viewing and call interaction by the additional user. The displayable call content is streaming video of a remote user on the phone call with the user of the mobile device; and the method further comprising receiving an input indicating intended interaction on the phone call by an additional user; and duplicating the streaming video for display on the rear-facing portion of the rollable display screen for viewing and call interaction by the additional user. The displayable call content is displayable as the phone call between the user of the mobile device and a remote user; and the method further comprising receiving an input indicating proximity of an additional user; and duplicating temporarily the displayable call content for display on the rear-facing portion of the rollable display screen for a viewable preview by the additional user.

A mobile device, comprising a rollable display screen configurable in one of multiple display states, including a front-facing portion of the rollable display screen and a rear-facing portion of the rollable display screen; and a call manager implemented at least partially in computer hardware and configured to detect that a phone call is initiated and displayable call content is associated with the phone call, the rollable display screen configured in a display state that facilitates use of at least one of the front-facing portion or the rear-facing portion of the rollable display screen to display the displayable call content associated with the phone call.

Alternatively or in addition to the above described mobile device: the displayable call content is one of streaming video of a remote user on the phone call, or real time text (RTT) displayable as a text conversation between a user of the mobile device and the remote user.

The invention claimed is:

1. A mobile device, comprising:
a rollable display screen configurable in one of multiple display states, including a front-facing portion of the rollable display screen and a rear-facing portion of the rollable display screen;
a call manager implemented at least partially in computer hardware and configured to cause the mobile device to:
detect that a phone call is initiated and displayable call content is associated with the phone call;
configure the rollable display screen in a display state that facilitates use of the front-facing portion of the rollable display screen to display the displayable call content associated with the phone call on the front-facing portion of the rollable display screen, the displayable call content being viewable on the front-facing portion of the rollable display screen by a first user of the mobile device;

receive an input indicating an intended interaction on the phone call by a second user, the input including one or more or of a gesture detected by a camera device or a proximity sensor input; and duplicate the displayable call content for display on the rear-facing portion of the rollable display screen for viewing and call interaction by the second user.

2. The mobile device of claim 1, wherein the displayable call content is determined for display on the front-facing portion of the rollable display screen based on the first user of the mobile device detected in a position to view the front-facing portion of the rollable display screen.

3. The mobile device of claim 1, wherein the call manager is configured to initiate operation of a slidable display mount that configures the rollable display screen corresponding to a partial form factor of the mobile device that facilitates utilization of a front-facing camera for the phone call.

4. The mobile device of claim 1, wherein the displayable call content is one of streaming video of a remote user on the phone call, or real time text (RTT) displayable as a text conversation between the first user of the mobile device and the remote user.

5. The mobile device of claim 1, wherein the call manager is configured to cause the mobile device to turn off the display of the displayable call content on the front-facing portion of the rollable display screen during the phone call.

6. The mobile device of claim 1, wherein:
the displayable call content is real time text (RTT) displayable as a text conversation between the first user of the mobile device and a remote user on the phone call; and
the call manager is configured to cause the mobile device to duplicate the RTT for display on the rear-facing portion of the rollable display screen for viewing and call interaction by the second user.

7. The mobile device of claim 6, wherein the input indicating the intended interaction on the phone call by the second user includes a keyword detected in the RTT.

8. The mobile device of claim 1, wherein:
the displayable call content is streaming video of a remote user on the phone call with the first user of the mobile device; and
the call manager is configured to cause the mobile device to duplicate the streaming video for display on the rear-facing portion of the rollable display screen for viewing and call interaction by the second user.

9. The mobile device of claim 8, wherein the input indicating the intended interaction on the phone call by the second user includes a detected audio input from the first user of the mobile device or the remote user on the phone call.

10. The mobile device of claim 1, wherein:
the displayable call content is displayable as the phone call between the first user of the mobile device and a remote user;
the call manager is configured to cause the mobile device to temporarily duplicate the displayable call content for display on the rear-facing portion of the rollable display screen for a viewable preview by the second user.

11. The mobile device of claim 1, wherein:
the displayable call content is displayable as the phone call between the first user of the mobile device and a remote user; and
the call manager is configured to cause the mobile device to transmit, to a remote device connected for the phone call, a first call video of the phone call with the first user and a second call video of the phone call with the second user for a dual-capture viewfinder view of the phone call at the remote device.

12. A method, comprising:
detecting that a phone call is initiated on a mobile device that has a rollable display screen configurable in one of multiple display states, the rollable display screen including a front-facing portion of the rollable display screen and a rear-facing portion of the rollable display screen;
detecting that a first user of the mobile device is in a position to view the front-facing portion of the rollable display screen;
configuring the rollable display screen in a display state that facilitates use of the front-facing portion of the rollable display screen to display displayable call content associated with the phone call;
receiving an input indicating an intended interaction on the phone call by a second user, the input including one or more or of a gesture detected by a camera device or a proximity sensor input; and
duplicating the displayable call content for display on the rear-facing portion of the rollable display screen for viewing and call interaction by the second user.

13. The method of claim 12, further comprising:
turning-off the display of the displayable call content on the front-facing portion of the rollable display screen during the phone call.

14. The method of claim 12, wherein:
the displayable call content is real time text (RTT) displayable as a text conversation between the first user of the mobile device and a remote user on the phone call; and
the method further comprising:
duplicating the RTT for display on the rear-facing portion of the rollable display screen for viewing and call interaction by the second user.

15. The method of claim 12, wherein:
the displayable call content is streaming video of a remote user on the phone call with the first user of the mobile device; and
the method further comprising:
duplicating the streaming video for display on the rear-facing portion of the rollable display screen for viewing and call interaction by the second user.

16. The method of claim 12, wherein:
the displayable call content is displayable as the phone call between the first user of the mobile device and a remote user; and
the method further comprising:
duplicating temporarily the displayable call content for display on the rear-facing portion of the rollable display screen for a viewable preview by the second user.

17. A mobile device, comprising:
a rollable display screen configurable in one of multiple display states, including a front-facing portion of the rollable display screen and a rear-facing portion of the rollable display screen; and
a call manager implemented at least partially in computer hardware and configured to cause the mobile device to:

detect that a phone call is initiated and displayable call content is associated with the phone call, the displayable call content being viewable on the front-facing portion of the rollable display screen by a first user of the mobile device; and determine an intended interaction on the phone call by a second user, wherein the displayable call content is duplicated for display on the rear-facing portion of the rollable display screen for viewing and call interaction by the second user.

18. The mobile device of claim 17, wherein the displayable call content is one of streaming video of a remote user on the phone call, or real time text (RTT) displayable as a text conversation between the first user of the mobile device and the remote user.

19. The mobile device of claim 17, wherein the call manager is configured to cause the mobile device to one of:
receive an input by the first user indicating the intended interaction on the phone call by the second user; or
detect the intended interaction on the phone call by the second user based on one or more of a gesture detected by a rear-facing camera, a proximity sensor input, or a detected audio input.

20. The mobile device of claim 17, wherein the call manager is configured to cause the mobile device to transmit, to a remote device connected for the phone call, a first call video of the phone call with the first user and a second call video of the phone call with the second user for a dual-capture viewfinder view of the phone call at the remote device.

* * * * *